(12) United States Patent
Saeki et al.

(10) Patent No.: US 9,732,874 B2
(45) Date of Patent: Aug. 15, 2017

(54) COMPOSITE VALVE WITH MAIN VALVE ELEMENT AND SUB-VALVE ELEMENT

(71) Applicant: TGK CO., LTD, Tokyo (JP)

(72) Inventors: Shinji Saeki, Tokyo (JP); Yuuki Kaneko, Tokyo (JP); Masaaki Tonegawa, Tokyo (JP)

(73) Assignee: TGK CO., LTD., Tokyo (JP)

( * ) Notice: Subject to any disclaimer, the term of this patent is extended or adjusted under 35 U.S.C. 154(b) by 344 days.

(21) Appl. No.: 14/080,708

(22) Filed: Nov. 14, 2013

(65) Prior Publication Data

US 2014/0130916 A1    May 15, 2014

(30) Foreign Application Priority Data

Nov. 15, 2012 (JP) ................................. 2012-250958

(51) Int. Cl.
*F16K 31/06* (2006.01)
*F04B 27/18* (2006.01)

(52) U.S. Cl.
CPC ...... *F16K 31/0603* (2013.01); *F04B 27/1804* (2013.01); *F16K 31/0613* (2013.01); *F04B 2027/1813* (2013.01); *F04B 2027/1827* (2013.01); *F04B 2027/1831* (2013.01); *Y10T 137/86879* (2015.04)

(58) Field of Classification Search
CPC .......... F04B 27/1804; F04B 2027/1813; F04B 2027/1827; F04B 2027/1831; F04B 2027/1854; F04B 2027/1859; F16K 31/0603
See application file for complete search history.

(56) References Cited

U.S. PATENT DOCUMENTS

| | | | |
|---|---|---|---|
| 7,128,304 B2 | 10/2006 | Morisawa et al. | ........ 251/129.18 |
| 8,079,827 B2 | 12/2011 | Iwa et al. | ................... 417/222.2 |
| 2005/0211939 A1* | 9/2005 | Morisawa | ........... F04B 27/1804 |
| | | | 251/129.15 |

(Continued)

FOREIGN PATENT DOCUMENTS

| | | |
|---|---|---|
| EP | 1582742 A2 | 10/2005 |
| EP | 1650435 A1 | 4/2006 |

(Continued)

OTHER PUBLICATIONS

European Search Report and the European Search Opinion (EPO), issued in Application No. 13192635.4, European Patent Office, Feb. 28, 2014.

(Continued)

*Primary Examiner* — William H Rodriguez
*Assistant Examiner* — Christopher Brunjes
(74) *Attorney, Agent, or Firm* — Martine Penilla Group, LLP

(57) ABSTRACT

A control valve according to an exemplary embodiment includes an interlocking mechanism that achieves a first operation and a second operation simultaneously or continuously. In the first operation, a sub-valve is opened by having an actuating rod displaced integrally with a sub-valve element in accordance with the magnitude of solenoidal force. In the second operation, a load, by which to bias a main valve element in a closing direction of a main valve, is increased by displacing the actuating rod relative to the main valve element.

19 Claims, 10 Drawing Sheets

(56) References Cited

U.S. PATENT DOCUMENTS

2005/0276700 A1   12/2005   Hirota .................... 417/222.2
2013/0001450 A1*  1/2013   Hirota .................... F04B 1/295
                                                      251/129.15

FOREIGN PATENT DOCUMENTS

| JP | 2006144580 A | 6/2006 | ............. F04B 27/14 |
| JP | 2008-240580 | 9/2008 | ............. F04B 27/14 |
| JP | 2008240580 | 10/2008 | ............. F04B 27/14 |
| JP | 2008240580 A * | 10/2008 | |
| JP | 2010-249007 | 11/2010 | ............. F04B 27/14 |

OTHER PUBLICATIONS

JP2012-250958 Office Action, Mar. 15, 2016, Ref. TGK12-126, Dispatch No. 121982, English Translation.
JP2012-250958 Office Action, Mar. 15, 2016, Ref. TGK12-126, Dispatch No. 121982, Japanese language.
CN201310567013.2 Office Action, Mar. 25, 2016, File No. 2016032201434310, English Translation.
CN201310567013.2 Office Action, Mar. 25, 2016, File No. 2016032201434310, Chinese language.

\* cited by examiner

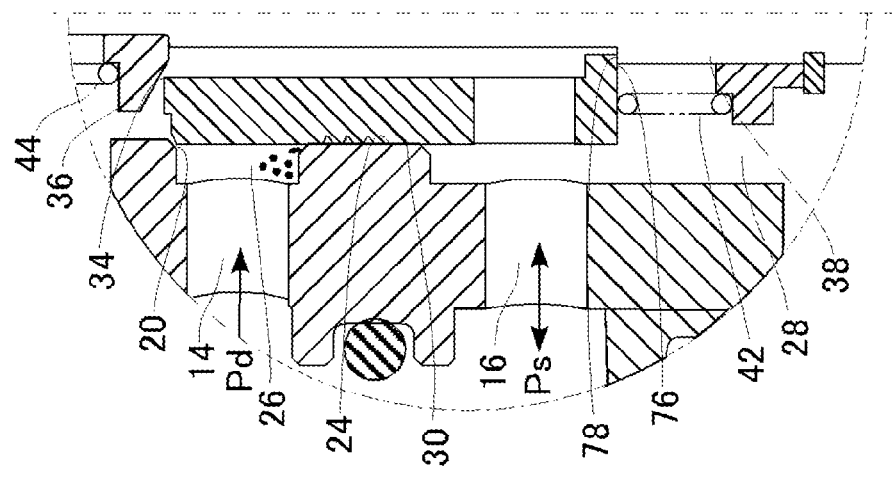
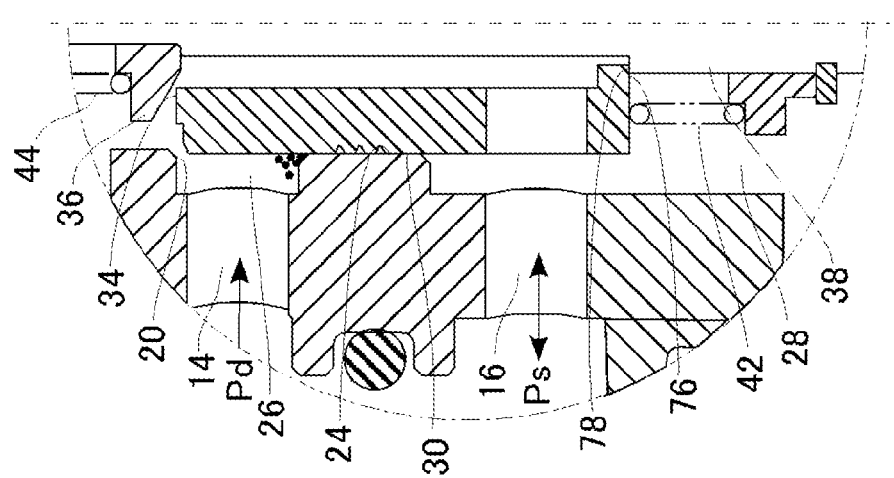
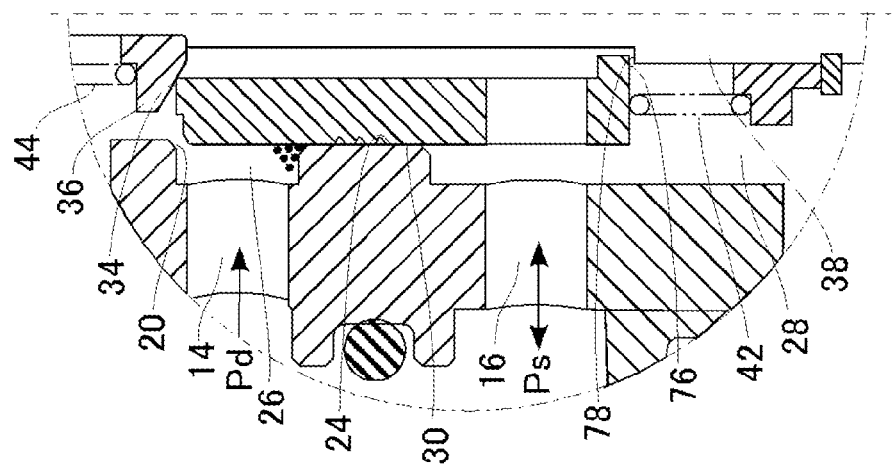

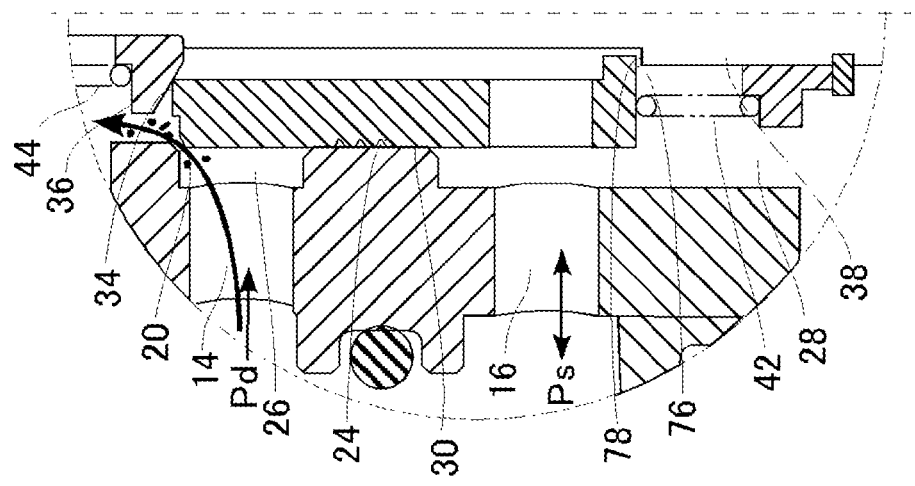
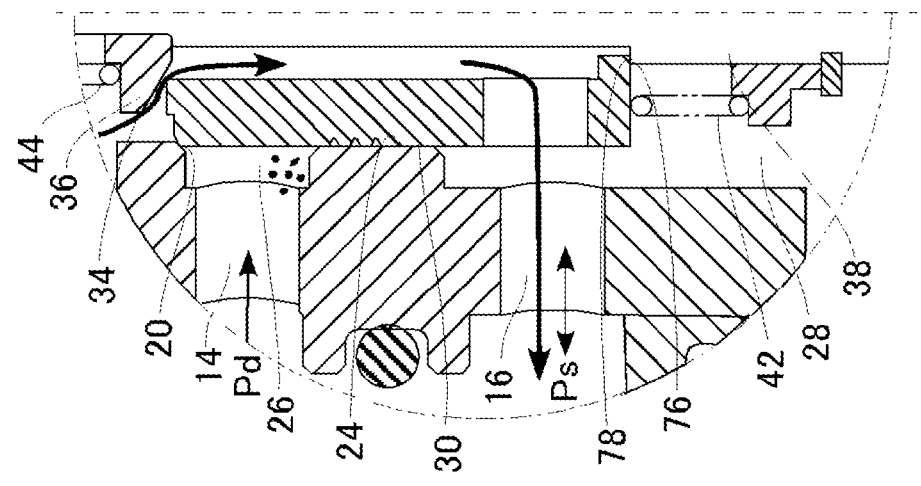
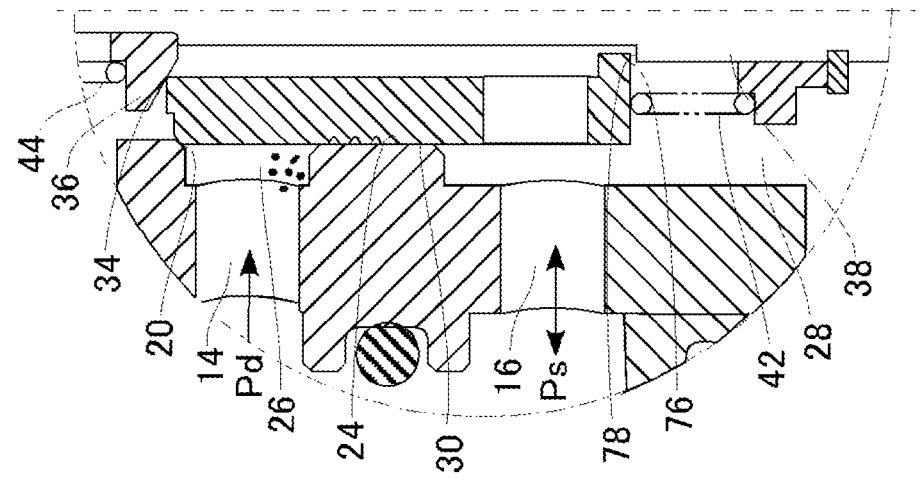

COMPOSITE VALVE WITH MAIN VALVE ELEMENT AND SUB-VALVE ELEMENT

CLAIM OF PRIORITY TO RELATED APPLICATION

The present application is claiming priority of Japanese Patent Application No. 2012-250958, filed on Nov. 15, 2012, the content of which is incorporated herein by reference.

BACKGROUND OF THE INVENTION

1. Field of the Invention

The present invention relates to a composite valve and it particularly relates to a composite valve, provided with a main valve and a sub-valve in a common body, which is driven by a single solenoid.

2. Description of the Related Art

An automotive air conditioner generally includes a compressor, a condenser, an expander, an evaporator, and so forth. Here, the compressor discharges a high-temperature and high-pressure gaseous refrigerant produced by compressing a refrigerant flowing through a refrigeration cycle of a vehicle. The condenser condenses the gaseous refrigerant. The expander produces a low-temperature and low-pressure refrigerant by adiabatically expanding the condensed liquid refrigerant. The evaporator evaporates the refrigerant and thereby causes a heat exchange of the refrigerant with air inside a vehicle's compartment. The refrigerant evaporated by the evaporator is again brought back to the compressor and thus circulates through the refrigeration cycle.

The compressor is, for example, a variable displacement compressor (hereinafter referred to simply as "compressor" also) capable of varying the refrigerant discharging capacity in order to maintain a constant level of cooling capacity irrespective of the engine speed. This compressor has a piston for compression linked to a wobble plate that is mounted to a rotational shaft driven by an engine, and the compressor regulates the refrigerant discharge rate by changing the stroke of the piston through changes in the angle of the wobble plate. The angle of the wobble plate can be changed continuously by changing the balance of pressure working on both faces of the piston as part of the discharged refrigerant is introduced into an airtight crankcase. The pressure within this crankcase (hereinafter referred to as "crank pressure") Pc is controlled by a control valve for a variable displacement compressor (hereinafter referred to simply as "control valve" also), which is provided between the discharge chamber of the compressor and the crankcase.

Such a control valve regulates the valve opening degree by supplying the externally applied current to a solenoid, which functions as a driver part. Suppose that an air conditioning function needs to be quickly fulfilled at the startup or the like of the air conditioner. Then, a valve section is set to a closed state by supplying the maximum current to the solenoid, for instance. Also, the wobble plate is tilt relative to the rotational shaft for a large angle by lowering a crank pressure Pc. As a result, the compressor can be operated at the maximum capacity. When the engine load of a vehicle is high, the compressor can be operated at the minimum capacity by fully opening the valve section with the solenoid turned off and by setting the wobble plate substantially at a right angle to the rotational shaft with the crank pressure Pc set high.

The control valve like this is disclosed in Reference (1) in the following Related Art List, for instance. That is, the control valve is provided with a main valve in a main passage that communicates the discharge chamber with the crankcase and also a sub-valve in a sub-passage that communicates the crankcase with the suction chamber. And the main valve and the sub-valve are driven by a single solenoid. During a steady operation, this control valve regulates the opening degree of the main valve with the sub-valve closed. Thereby, the crank pressure Pc can be controlled and the discharging capacity can also be controlled as described above. On the other hand, at a power-on of the air conditioner, the sub-valve is open with the main valve closed. Thereby, the crank pressure Pc is quickly lowered. As a result, the compressor can promptly shift its operation mode to a maximum-capacity operation. Also, a plurality of valves are opened and closed by the use of a single solenoid. Thus, the control valve can be of a reduced size as a whole.

In such a control valve as described above, the main valve and sub-valve are driven by the single solenoid. Thus, a main valve element and a sub-valve element are provided along the same axis line, and the control valve has a mechanism that transports the solenoidal force to the each valve element by way of an actuating rod provided along said axis line. The body of the control valve has a main valve hole, and the main valve element has a sub-valve hole. That is, the sub-passage runs through the main valve element. The main valve element touches and leaves a main valve seat, provided in an opening end of the main valve hole, so as to close and open the main valve, respectively. And the sub-valve element touches and leaves a sub-valve seat, provided in an opening end of the sub-valve hole, so as to close and open the sub-valve, respectively. Since, however, the sub-valve is pressed against the sub-valve seat by the biasing force of a spring during a steady operation of the compressor, the sub-valve is kept closed. At the startup of the compressor, the solenoidal force is at its maximum and the sub-valve element is further biased in a valve opening direction while the main valve element is seated on the main valve seat. This opens the sub-valve.

RELATED ART LIST (1) Japanese Unexamined Patent Application Publication (Kokai) No. 2008-240580.

Such a control valve as described above is structured such that the main valve element is slidably supported by the body. Thus, it is problematic that there are many cases where foreign materials may enter its sliding portion and be entangled there. In other words, the refrigerant discharged may contain the foreign material, such as metallic powders, which has come off as a result of friction of a piston in the compressor, and the foreign material may enter the sliding portion between the main valve element and the body to prevent a smooth movement of the main valve element and may eventually lock the main valve element at the worst case. Particularly when the compressor is switched from on to off and then the main valve element is much displaced toward a fully open state, such foreign materials may be drawn into the sliding portion and adhere to the sliding portion when the main valve is fully open.

In such a case, as cited in Reference (1), for example, there are cases where the structure, in which the main valve element is biased by the spring alone, cannot provide a driving force sufficient to operate the main valve element in a valve closing direction, even though the compressor is turned on again. In this case, it is difficult to start the compressor even though the sub-valve can be opened. Thus, it is necessary to not only take measures to prevent such a locked state from occurring but also promptly release the locked state if the locked state should occur. In this regard, a structure may be, for example, implemented where the actuating rod and the main valve element are integrally configured and the main valve element is directly pushed by the actuating rod. However, this structure does not allow the actuating rod to displace the sub-valve element relative to the main valve element, so that the sub-valve cannot be opened according to the solenoidal force. This creates an undesirable conflict. Note that such problems may occur not only in the control valve for a variable displacement compressor as cited in Reference (1) but also in a composite valve where the main valve and the sub-valve are driven by a single solenoid.

SUMMARY OF THE INVENTION

The present invention has been made in view of the foregoing problems, and a purpose thereof is to realize both a function by which to release the locked state of a main valve and a function of opening and closing a sub-valve by the solenoidal force, in a composite valve that drives the main valve and the sub-valve by a single solenoid.

In order to resolve the aforementioned problems, a composite valve according to one embodiment of the present invention includes: a body having a lead-in/out port through which a working fluid is led in or led out, a lead-in port through which the working fluid is led in, and a lead-out port through which the working fluid is led out; a main valve provided in a main passage that communicates between the lead-in port and the lead-in/out port; a sub-valve provided in a sub-passage that communicates between the lead-in/out port and the lead-out port; a main valve element configured to open and close the main valve by touching and leaving a main valve seat provided in the main passage, the main valve element being slidably supported by a guiding passage provided in the body; a sub-valve element configured to open and close the sub-valve by touching and leaving a sub-valve seat provided in the sub-passage; a solenoid configured to generate a solenoidal force in accordance with an amount of current supplied; an actuating rod configured to be capable of directly or indirectly transmitting the solenoidal force to the main valve element and the sub-valve element, the actuating rod being coupled to the solenoid; a biasing member configured to bias the main valve element in a closing direction of the main valve; and an interlocking mechanism configured to continuously perform a first operation of opening the sub-valve in a manner such that the actuating rod is displaced integrally with the sub-valve element in accordance with a magnitude of the solenoidal force and a second operation of increasing a pressing load, by which to press the main valve element in the closing direction of the main valve, in a manner such that the actuating rod is displaced relative to the main valve element after the opening of the sub-valve starts, in accordance with a magnitude of the solenoidal force.

By employing this embodiment, the interlocking mechanism by the solenoidal force works even if the entry of foreign material into the guiding passage when the main valve is opened causes the main valve element to be locked. Displacing the actuating rod by the interlocking mechanism enables the sub-valve element to be displaced integrally with the actuating rod, so that the sub-valve can be reliably opened. Also, the pressing load, by which to press the main valve element in the closing direction of the main valve (i.e., in a direction that releases the locking), is increased by displacing the actuating rod relative to the main valve element after the sub-valve has been opened, so that the locking can be released. In this manner, the function of releasing the locked state of the main valve element and the function of opening/closing the sub-valve by the solenoidal force can both be achieved in a process of displacing the actuating rod.

Another embodiment of the present invention relates also to an composite valve. The composite valve includes: a body having a lead-in/out port through which a working fluid is led in or led out, a lead-in port through which the working fluid is led in, and a lead-out port through which the working fluid is led out; a main valve provided in a main passage that communicates between the lead-in port and the lead-in/out port; a sub-valve provided in a sub-passage that communicates between the lead-in/out port and the lead-out port; a main valve element configured to open and close the main valve by touching and leaving a main valve seat provided in the main passage, the main valve element being slidably supported by the body; a sub-valve element configured to open and close the sub-valve by touching and leaving a sub-valve seat provided in the sub-passage; a solenoid configured to generate a solenoidal force in accordance with an amount of current supplied; an actuating rod configured to be capable of directly or indirectly transmitting the solenoidal force to the main valve element and the sub-valve element, the actuating rod being coupled to the solenoid; a biasing member configured to bias the main valve element in a closing direction of the main valve; and a pressing mechanism configured to increase a pressing load, by which to press the main valve element in the closing direction of the main valve, in a manner such that the actuating rod is displaced relative to the main valve element.

By employing this embodiment, the pressing mechanism works according to magnitude of the solenoidal force even if the foreign material enters the spacing between the main valve element and the body when the main valve is opened. The pressing load, by which to press the main valve element in the closing direction of the main valve (i.e., in a direction that releases the locking), is increased by displacing the actuating rod relative to the main valve element by the pressing mechanism, so that the locking can be released. Also, the load of the actuating rod is reduced by releasing the clocked state of the main valve element, so that the solenoidal force is easily transmitted to the sub-valve element.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIGS. 5A to 5C each corresponds to an enlarged view of a circular region D of FIG. 2 and show exemplary operations of a lock release mechanism;

FIGS. 6A to 6C each corresponds to an enlarged view of a circular region D of FIG. 2 and show exemplary operations of a lock release mechanism;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

The present invention will now be described in detail based on preferred embodiments with reference to the accompanying drawings. In the following description, for convenience of description, the positional relationship in each structure may be expressed as "vertical" or "up-down" with reference to how each structure is depicted in Figures.

First Embodiment

Figure 1:
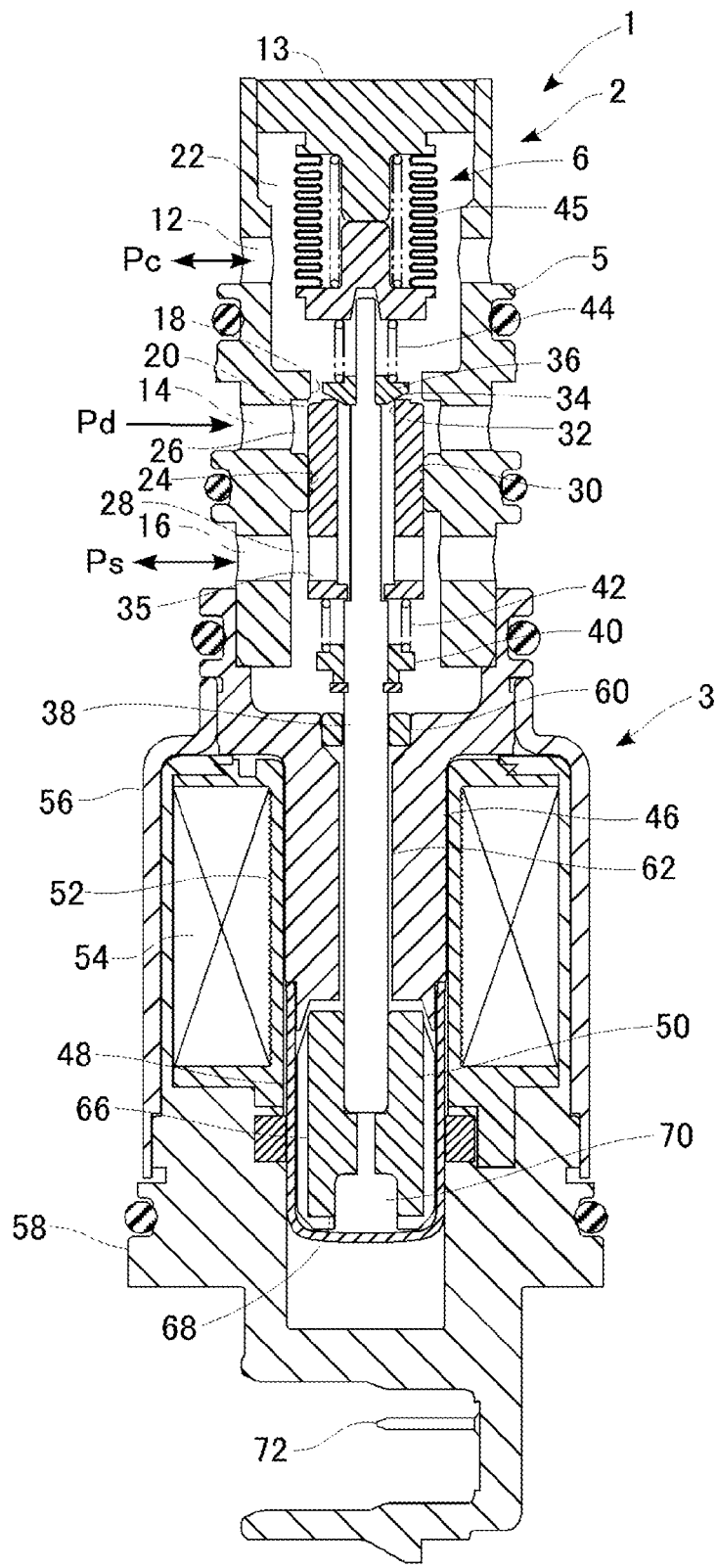
FIG. 1 is a cross-sectional view showing a structure of a control valve according to a first embodiment.

FIG. 1 is a cross-sectional view showing a structure of a control valve according to a first embodiment. A control valve 1 is configured as an electromagnetic valve for controlling a discharging capacity of a not-shown variable displacement compressor (hereinafter referred to simply as "compressor") installed for a refrigeration cycle of an automotive air conditioner. This compressor discharges a high-temperature and high-pressure gaseous refrigerant produced by compressing a refrigerant flowing through the refrigeration cycle. The gaseous refrigerant is then condensed by a condenser (external heat exchanger) and further adiabatically expanded by an expander so as to become a misty, low-temperature and low-pressure refrigerant. This low-temperature and low-pressure refrigerant is evaporated by an evaporator, and the evaporative latent heat cools the air of an interior of a vehicle. The refrigerant evaporated by the evaporator is again brought back to the compressor and thus circulates through the refrigeration cycle. The compressor, which has a rotational shaft rotatingly driven by an engine of an automobile, is configured such that a piston for compression is linked to a wobble plate mounted to the rotational shaft. The compressor controls a refrigerant discharge rate by changing the stroke of the piston through changes in the angle of the wobble plate. The control valve 1 changes the angle of the wobble plate and consequently changes the discharging capacity of the compressor by controlling a flow rate of the refrigerant to be introduced from a discharge chamber to a crankcase of the compressor.

The control valve 1 is constituted as a so-called Ps sensing valve that controls the flow rate of refrigerant introduced from the discharge chamber to the crankcase so that a suction pressure Ps of the compressor can be maintained at a certain set pressure. The control valve 1 is constituted by integrally assembling a valve unit 2 and a solenoid 3. The valve unit 2 includes a main valve for opening and closing a refrigerant passage used to lead a part of the discharged refrigerant to the crankcase, during an operation of the compressor, and a sub-valve that functions as a so-called bleed valve for releasing the refrigerant in the crankcase to a suction chamber, at a startup of the compressor. The solenoid 3 regulates the opening degree of the main valve by driving the main valve in a valve opening or closing direction, and controls the flow rate of refrigerant introduced into the crankcase. The valve unit 2 includes a body 5 of stepped cylindrical shape, a main valve and a sub-valve, which are provided inside the body 5, a power element 6, which generates a drive force against a solenoidal force to adjust the opening degree of the main valve, and so forth. The power element 6 functions as a "pressure-sensing section".

The body 5 has ports 12, 14 and 16, in this order from down, on a lateral side thereof. The port 12 functions as a "crankcase communication port" that communicates with the crankcase. The port 14 functions as a "discharge chamber communication port" that communicates with the discharge chamber. The port 16 functions as a "suction chamber communication port" that communicates with the suction chamber. An upper-end opening of the body 5 is sealed by an end member 13, and a lower end of the body 5 is coupled to an upper end of the solenoid 3. The main passage, which communicates the port 12 with the port 14, and the sub-passage, which communicates the port 12 with the port 16 are formed inside the body 5. The main valve is provided in the main passage, and the sub-valve is provided in the sub-passage. A main valve hole 18 is formed in the main passage, and a main valve seat 20 is formed in a tapered surface on a lower-end opening end edge on the main valve hole 18.

Through the port 14, the refrigerant at a discharge pressure Pd is introduced from the discharge chamber. Through the port 12, the refrigerant at a crank pressure Pc having passed through the main valve is led out toward the crankcase during a steady operation of the compressor. Also, through the port 12, the refrigerant at the crank pressure Pc discharged from the crankcase is led in at a startup of the compressor. At this time, the thus led-in refrigerant is introduced to the sub-valve. A working chamber 22, which is filled with the refrigerant at the crank pressure Pc, is formed between the port 12 and the main valve hole 18. The power element 6 is disposed in the working chamber 22. Through the port 16, the refrigerant at a suction pressure Ps is led in during a steady operation of the compressor and, on the other hand, the refrigerant at the suction pressure Ps having passed through the sub-valve is led out toward the suction chamber at a startup of the compressor.

A guiding passage 24 is formed coaxially with the main valve hole 18 between the port 14 and the port 16. A valve chamber 26 is formed between the guiding passage 24 and the port 14, and a pressure chamber 28 is formed between the guiding passage 24 and the port 16. A cylindrical main valve element 30 is slidably inserted to the guiding passage 24. The main valve element 30 closes and opens the main valve by touching and leaving the main valve seat 20 from a valve chamber 26 side, respectively. Thereby, the flow rate of refrigerant flowing from the discharge chamber to the crankcase is regulated. Also, a sub-valve hole 32 is provided inside the main valve element 30, and a sub-valve seat 34 is formed in an upper-end opening of the sub-valve hole 32. A lower part of the main valve element 30 extends to the pressure chamber 28, and a communicating hole 35, which communicates the inside and outside of the main valve element 30, is provided near a lower end thereof. A sub-valve element 36 of stepped disk shape is provided in the working chamber 22. The sub-valve element 36 is disposed in a position opposite to the main valve element 30 in a direction of axis line, and closes and opens the sub-valve by touching and leaving the sub-valve seat 34, respectively.

An elongated actuating rod 38 is provided along the axis line of the body 5. The actuating rod 38 and the power element 6 are connected such that an upper end of the actuating rod 38 can be operatively coupled or linked to the power element 6 and such that a lower end thereof can be operatively coupled or linked to a plunger 50. An upper half of the actuating rod 38 penetrates the main valve element 30 and the sub-valve element 36, and the actuating rod 38 supports the sub-valve element 36 from below at a stepped portion provided near the upper end thereof. A spring support member 40 is provided in a middle of the actuating rod 38. A spring 42 (functioning as a "first biasing member" and an "elastic body") that biases the main valve element 30 in a closing direction of the main valve is set between the main valve element 30 and the spring support member 40. Also, a spring 44 (functioning as a "second biasing member" and an "elastic body") that biases not only the sub-valve element 36 in a closing direction of the sub-valve but also the main valve element 30 in an opening direction of the main valve is set between the power element 6 and the sub-valve element 36.

The power element 6 includes a bellows 45 that develops a displacement by sensing the crank pressure Pc. And the power element 6 generates an opposing force to oppose the solenoidal force by the displacement. This opposing force is also transmitted to the main valve element 30 by way of the actuating rod 38 and the sub-valve element 36. When the sub-valve element 36 is seated on the sub-valve seat 34 with the result that the sub-valve is closed, the relief of refrigerant from the crankcase to the suction chamber is blocked. Also, when the sub-valve is opened with the sub-valve element 36 spaced apart from the sub-valve seat 34, the relief of refrigerant from the crankcase to the suction chamber is permitted.

The solenoid 3 includes a stepped cylindrical core 46, a bottomed cylindrical sleeve 48, which is so assembled as to seal off a lower-end opening of the core 46, a cylindrical plunger 50, which is housed in the sleeve 48 and which is disposed in a position opposite to the core 46 in the direction of axis line, a cylindrical bobbin 52, which is disposed in such a manner as to envelop the core 46 and the sleeve 48, an electromagnetic coil 54, wound around the bobbin 52, which generates a magnetic circuit when the solenoid 3 electrically conducts, a casing 56, which is so provided as to cover the electromagnetic coil 54 from outside and which also functions as a yoke, and an end member 58, which is so provided as to seal off a lower-end opening of the casing 56. In the present embodiment, the body 5, the core 46, the casing 56 and the end member 58 form a body for the whole control valve 1.

The valve unit 2 and the solenoid 3 are secured such that a lower end of the body 5 is press-fitted to an upper-end opening of the core 46. The diameter of an upper half of the core 46 is enlarged, and the pressure chamber 28 filled with the refrigerant having the suction pressure Ps is formed between the core 46 and the body 5. The actuating rod 38 is inserted to the core 46 such that the actuating rod 38 penetrates a center of the core 46 in the direction of axis line. Since the lower end of the actuating rod 38 is inserted to an upper half of the plunger 50, the actuating rod 38 and the plunger 50 are coaxially connected to each other. The actuating rod 38 is supported by the plunger 50 from below and is configured such that actuating rod 38 can be operatively coupled or linked to the main valve element 30, the sub-valve element 36 and the power element 6. The actuating rod 38 directly transmits the solenoidal force, which is a suction force generated between the core 46 and the plunger 50, to the sub-valve element 36, on one hand, and transmits it to the main valve element 30 through the spring 42, on the other hand. The actuating rod 38 also transmits a reaction force generated by an expansion/contraction movement of the power element 6, namely the opposing force to oppose the solenoidal force, to the plunger 50. In the present embodiment, the biasing force of the spring 44 is transmitted to the actuating rod 38 by way of the sub-valve element 36 and thereby the actuating rod 38 is pressed against the plunger 50. As a result, the connection status of the actuating rod 38 and the plunger 50 is stably maintained.

A ring-shaped shaft support member 60 is press-fitted on an upper end of the core 46, and the actuating rod 38 is slidably supported by the shaft support member 60 in the direction of axis line. A communicating groove (not shown) in parallel with the direction of axis line is formed in a predetermined position of the outer periphery of the shaft support member 60. The suction pressure Ps, which is led in and out through the port 16, passes through a communicating path 62, which is formed by the communicating groove and the spacing between the actuating rod 38 and the core 46, and is then led into the sleeve 48 as well.

The communicating path 62 functions as a orifice by which the interior of the sleeve 48 functions as an oil damper chamber. In other words, in the present embodiment, the same type of oil as that contained in the refrigerant for lubrication of the compressor is introduced, in advance, into the sleeve 48 as part of a manufacturing process of the control valve 1. In the present embodiment, the communicating groove provided in the shaft support member 60 functions as a throttle passage, which gives resistance to the flow of oil into and out of the sleeve 48. By employing such a structure as this enables the sleeve 48 to function as the oil damper chamber and enables the micro-vibration and the like of the plunger 50 placed in the sleeve 48 to be suppressed. As a result, the occurrence of noise caused by such micro-vibration is prevented or suppressed. In a modification to the present embodiment, the arrangement may be such that the communicating path 62 functions as the throttle passage, which gives resistance to the flow of oil into and out of the sleeve 48. In other words, it is preferable that at least one of the communicating groove provided in the shaft support member 60 and the communicating path 62 functions as the throttle passage. Note that the spring 44 function as an off-spring that biases both the core 46 and the plunger 50 in a direction that in which they get mutually spaced apart from each other. The spring load of the spring 44 is set lager than that of the spring 42.

The sleeve 48 is made of a nonmagnetic material. A plurality of communicating grooves 66 are provided, in parallel with the axis line, on a side of the plunger 50. A plurality of communicating grooves 68, which extend radially and communicates the inside and the outside of the plunger 50, is provided at a lower end surface of the plunger 50. Such a structure as this enables the suction pressure Ps to be led to a back pressure chamber 70 through the spacing between the plunger 50 and the sleeve 48 even though the plunger 50 is positioned at a bottom dead point as shown in FIG. 1.

A pair of connection terminals 72 connected to the electromagnetic coil 54 extend from the bobbin 52 and are led outside by passing through the end member 58. Note that only one of the pair of connection terminals 72 is shown in FIG. 1 for convenience of explanation. The end member 58 is installed in such a manner as to seal the entire structure inside the solenoid 3 contained in the casing 56 from below. The end member 58 is molded (injection molding) of a corrosion-resistant resin, and the resin material is filled into gaps between the casing 56 and the electromagnetic coil 54 also. With the resin material filled into the gaps between the casing 56 and the electromagnetic coil 54, the heat release performance is improved because the heat generated by the electromagnetic coil 54 is easily conveyed to the casing 56.

The ends of the connection terminals 72 are led out from the end member 58 and connected to a not-shown external power supply.

Figure 2:
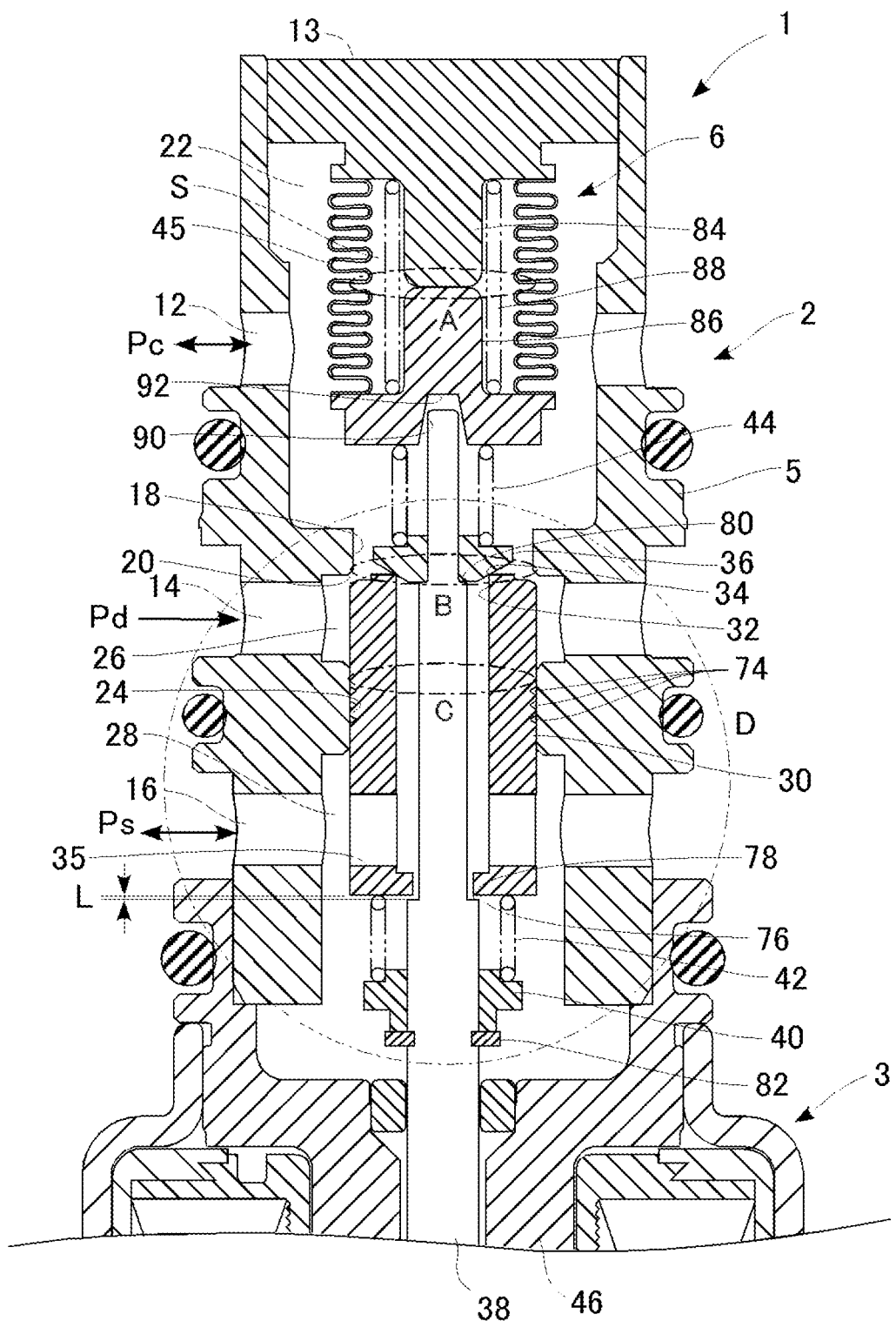
FIG. 2 is a partially enlarged sectional view of the upper half of FIG. 1.

FIG. 2 is a partially enlarged sectional view of the upper half of FIG. 1. A labyrinth seal 74 having a plurality of annular grooves by which to restrict the passage of refrigerant is provided in a sliding surface of the main valve element 30 relative to the guiding passage 24. The inside diameter of a lower-end opening of the main valve element 30 is slightly reduced, and a lower end surface of this reduced diameter portion constitutes an actuating surface 76 (this actuating surface 76 functions as a "to-be-engaged portion") capable of being engaged with the actuating rod 38 as appropriate. The actuating rod 38 is of a stepped cylindrical shape such that the diameter thereof is reduced in stages upward, and an engagement portion 78 is formed by a first stepped portion provided near the actuating surface 76. Also, a support portion 80 is formed by a second stepped portion provided near the sub-valve seat 34.

A through-hole in the direction of axis line is formed in a central part of the sub-valve element 36, and the upper end of the actuating rod 38 is inserted through this through-hole. A central part of a lower end face of the sub-valve element 36 is formed flat, and the sub-valve element 36 is supported from below in such a manner as to be in contact with the support portion 80. The sub-valve element 36 is of a tapered shape such that the cross section thereof, namely the diameter thereof, becomes larger upwardly, and the sub-valve element 36 touches and leaves the sub-valve seat 34 at a tapered surface. The position of each of the first and second stepped portions is set such that the engagement portion 78 is spaced apart from the actuating surface 76 at a predetermined interval L, while the sub-valve element 36 is seated on the sub-valve seat 34 as shown in FIG. 2. The predetermined interval L functions as a so-called "play" (backlash).

As the solenoidal force is increased, the actuating rod 38 resisting the biasing force of the spring 42 is displaced relative to the main valve element 30 and thereby the sub-valve element 36 is lifted from the sub-valve seat 34 so as to open the sub-valve. Also, the solenoidal force can be directly conveyed to the main valve element 30 with the engagement portion 78 and the actuating surface 76 being engaged with (abutted against) each other, so that the main valve element 30 can be pressed in a closing direction of the main valve with a force greater than the biasing force of the spring 42. This structure functions as a lock release mechanism (interlocking mechanism) that releases a locked state where the main valve element 30 is locked as a result of the entanglement of foreign material in the sliding portion of the main valve element 30 relative to the guiding passage 24, and its detailed structure will be described later. In the present embodiment, the arrangement is such that the actuating surface 76, which serves as the "to-be-engaged portion", is provided in the main valve element 30 and such that the engagement portion 78 of the actuating rod 38 is in surface-contact with the actuating surface 76 and then presses the actuating surface 76. However, the contact state where the engagement portion 78 and the to-be-engaged portion are abutted against each other is not limited to the surface contact and may be a line contact or a point contact as long as the solenoidal force can be directly transmitted to the main valve element 30.

A retaining ring 82 is fitted to an approximately midway part of the actuating rod 38, and a spring support member 40 is provided so that a lower movement is restricted by the retaining ring 82. The power element 6 is so structured that the upper end opening of the bellows 45 is closed by a first stopper 84 ("base member") and the lower end opening thereof is closed by a second stopper 86 ("base member"). The interior of the bellows 45 is an airtight reference pressure chamber S, and a spring 88 is interposed between the first stopper 84 and the second stopper 86 in such a manner as to bias the bellows 45 in an expanding direction. The reference pressure chamber S is in a vacuum state according to the present embodiment. The first stopper 84 is formed integrally with the end member 13. Thus, the first stopper 84 is fixed relative to the body 5.

Provided in the middle of a lower surface of the second stopper 86 is a fitting-groove 90 having a predetermined depth along the axis line, where an upper end portion of the actuating rod 38 is coupled detachably. The fitting-groove 90 abuts against an upper end surface of the actuating rod 38 at a bottom face 92 of the fitting-groove 90. The fitting-groove 90 is of a tapered shape such that the inside diameter thereof becomes larger downward from the bottom face 92. Thus the upper end of the actuating rod 38 does not slide on the fitting-groove 90. The actuating rod 38 is displaceable integrally with the power element 6 when the upper end surface of the actuating rod 38 is being stopped by the second stopper 86. Also, the actuating rod 38 is displaceable relative to the power element 6 when the upper end surface thereof is being spaced apart from the second stopper 86.

Since the spring 88 exerts a biasing force in such a manner as to move the first stopper 84 and the second stopper 86 apart from each other, the bellows 45 expands or contracts in the direction of axis line (opening/closing direction of the main valve and the sub-valve) according to a pressure difference between the crank pressure Pc and the reference pressure of the reference pressure chamber S. However, if the pressure difference becomes large, the end surfaces of the first stopper 84 and the second stopper 86 will abut against each other and will be stopped thereby as a result of a predetermined contraction of the bellows 45, thus restricting the contraction.

In the above-described structure, the main valve element 30 and the main valve seat 20 constitute a main valve, and the opening degree of the main valve regulates the flow rate of refrigerant flowing from the discharge chamber to the crankcase. Also, the sub-valve element 36 and the sub-valve seat 34 constitute a sub-valve, and the opening/closing of the sub-valve permits or shuts off the delivery of refrigerant from the crankcase to the suction chamber. In other words, the control valve 1 functions as a three-way valve, too, by opening either the main valve or the sub-valve.

According to the present embodiment, an effective pressure-receiving diameter A of the bellows 45, an effective pressure-receiving diameter B of the main valve element 30 in the main valve, and an effective pressure-receiving diameter C of the sliding portion of the main valve element 30 are set equal to each other. Thus, the effect of the discharge pressure Pd and the crank pressure Pc acting on the main valve element 30 is practically cancelled while the main valve element 30 and the power element 6 are operatively coupled to each other. As a result, when the main valve is under control, the main valve element 30 is opened or closed according to the suction pressure Ps received at the pressure chamber 28.

In such a structure as described above, the main valve operates autonomously so that, in a stable control state of the control valve 1, the suction pressure Ps of the pressure chamber 28 becomes a predetermined set pressure Pset. The set pressure Pset is basically adjusted beforehand by the spring loads of the springs 42, 44 and 88 and is set as a pressure value at which the freezing of the evaporator can be prevented in view of the relationship between the temperature in the evaporator and the suction pressure Ps. The set pressure Pset can be changed by varying the supply current (set current) to the solenoid 3. In the present embodiment, the load setting of the springs can be fine-adjusted by readjusting a press-fitting amount of the end member 13 when the assembly of the control valve 1 is nearly completed. By employing this method, the set pressure Pset can be adjusted with accuracy.

Figure 3:
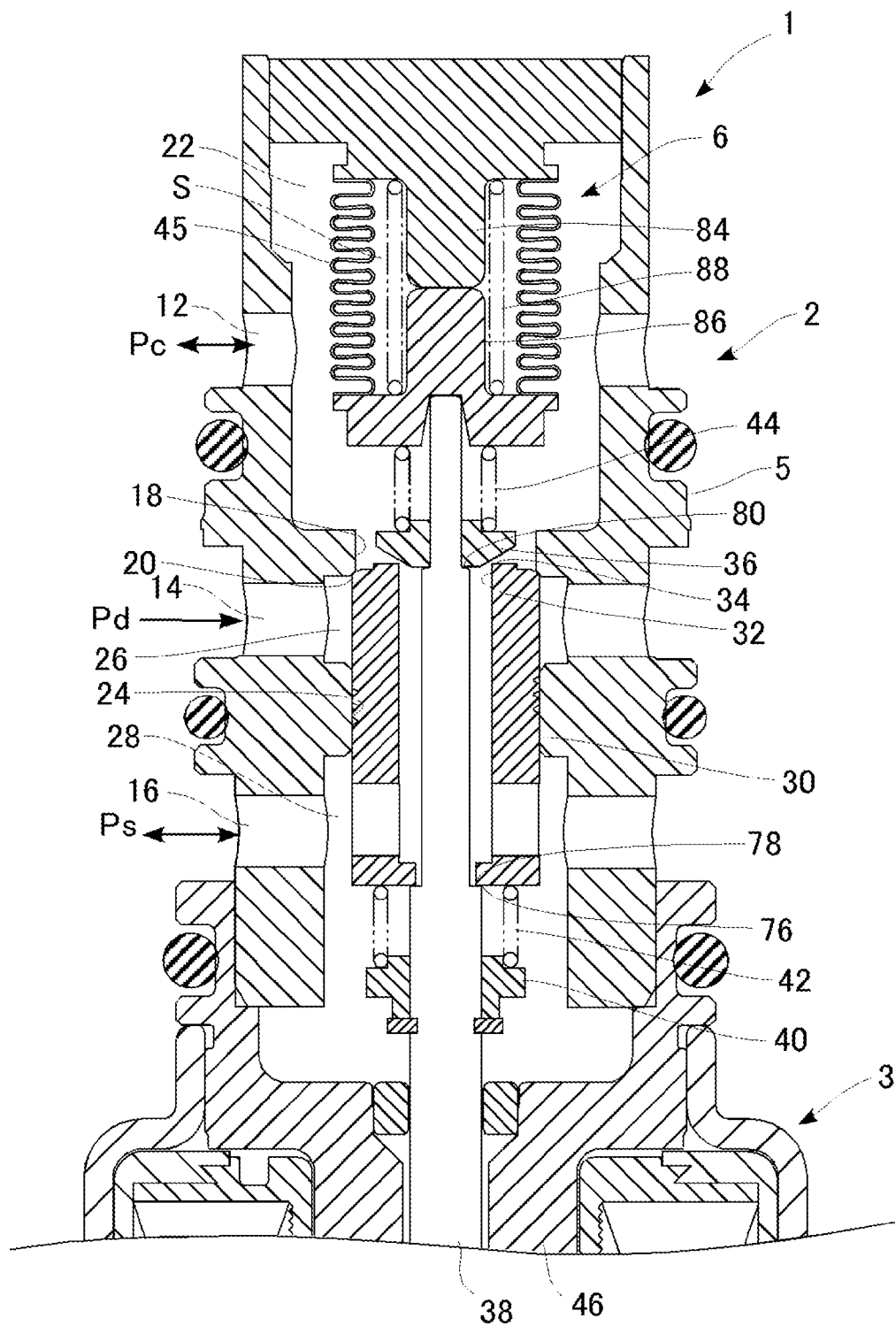
FIG. 3 shows an operation of a control valve.
Figure 4:
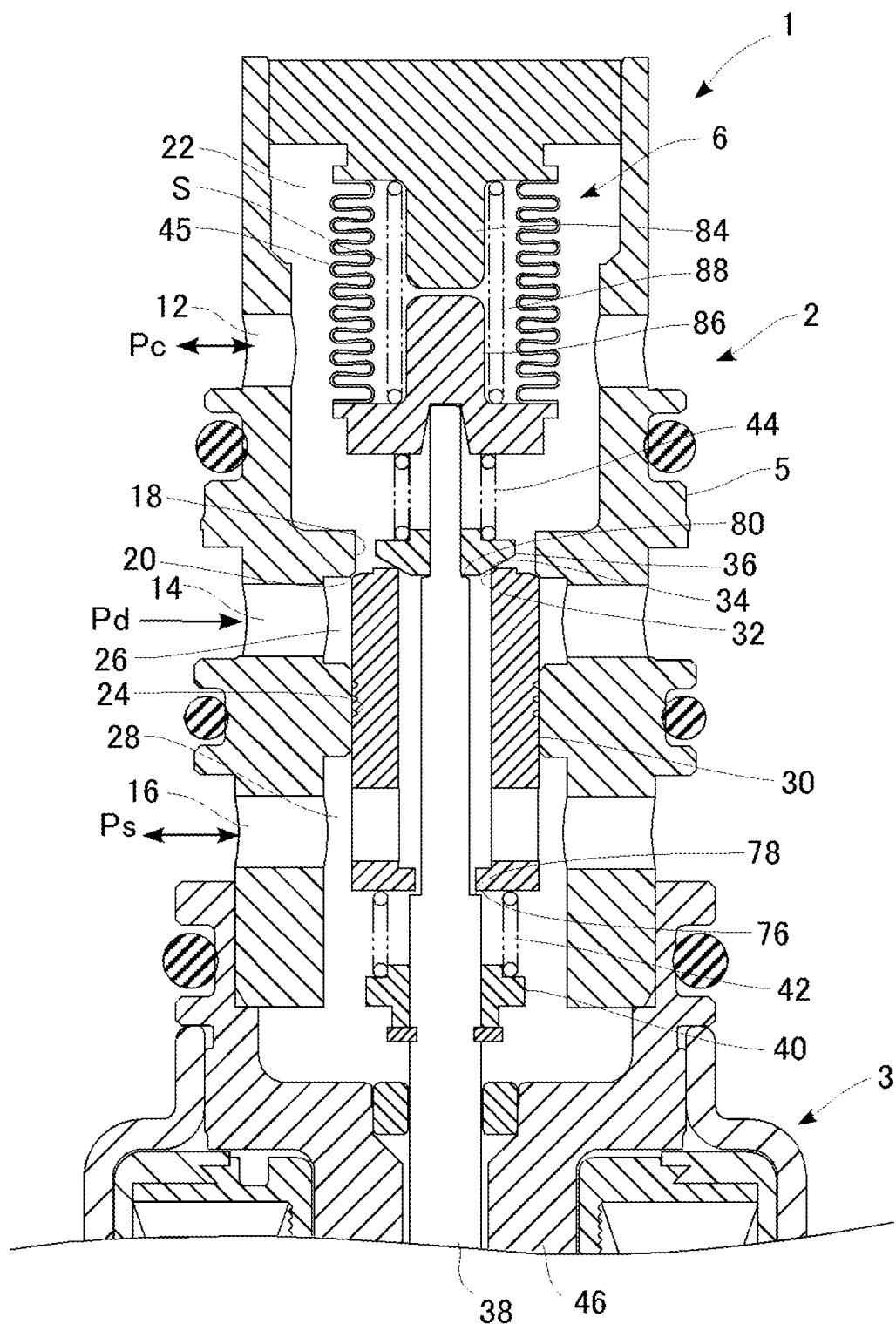
FIG. 4 shows an operation of a control valve.

Now, an operation of the control valve will be explained. FIG. 3 and FIG. 4 are each a diagram to explain an operation of the control valve, and FIG. 3 and FIG. 4 correspond to FIG. 2. FIG. 2, already described above, shows a state where the control valve operates with the minimum capacity. FIG. 3 shows a state where a bleed function is in effect. FIG. 4 shows a relatively stable control state. A description is given hereinbelow based on FIG. 1 with reference to FIG. 2 to FIG. 4, as appropriate.

While the solenoid 3 of the control valve 1 is not electrically conducting, namely while the automotive air conditioner is not operating, no suction power between the core 46 and the plunger 50 is in effect. At the same time, the suction pressure Ps is relatively high. Thus, as shown in FIG. 2, the biasing force of the spring 44 is transmitted to the main valve element 30 by way of the sub-valve element 36 while the bellows 45 contracts. As a result, the main valve element 30 is apart from the main valve seat 20 and therefore the main valve is fully opened. At this time, the sub-valve element 36 is seated on the sub-valve seat 34 and therefore the sub-valve is closed. The power element 6 is substantially disabled On the other hand, when a maximum control current is supplied to the electromagnetic coil 54 of the solenoid 3 at the startup or the like of the automotive air conditioner, the actuating rod 38 is driven by the solenoidal force as shown in FIG. 3. On one hand, the solenoidal force is transmitted to the main valve element 30 by way of the spring 42 and, on the other hand, it is directly transmitted to the sub-valve element 36 by the actuating rod 38. As a result, the main valve element 30 is seated on the main valve seat 20 so as to close the main valve, and the sub-valve element 36 gets separated away from the sub-valve seat 34 in synchronism with the closing of the main valve so as to open the sub-valve. However, since the engagement portion 78 is stopped by the actuating surface 76 and thereby the displacement of the actuating rod 38 is restricted, an uplift amount of the sub-valve element 36 (i.e., the opening degree of the sub-valve) agrees with the predetermined interval L as shown in FIG. 2. On the other hand, since the suction pressure Ps is relatively high normally at the startup, the bellows 45 maintains a contracted state so as to maintain the state where the sub-valve is being open. In other words, supplying the starting current to the solenoid 3 causes the main valve to be closed and thereby restricts the delivery of discharged refrigerant into the crankcase. At the same time, supplying the starting current thereto immediately opens the sub-valve so as to promptly relieve the refrigerant in the crankcase into the suction chamber. This can promptly start the compressor. Even when the suction pressure Ps is low and the bellows 45 has been expanded, such as when a vehicle is exposed to a low-temperature environment, supplying a large current to the solenoid 3 enables the sub-valve to be opened and therefore the compressor can be promptly started.

Then, in the controlled state where the value of current supplied to the solenoid 3 is set to a predetermined value, the suction pressure Ps is relatively low as shown in FIG. 4. Thus, the bellows 45 expands and the sub-valve element 36 is seated on the sub-valve seat 34, thereby closing the sub-valve. On the other hand, with the sub-valve being thus closed, the main valve element 30 is operated to regulate the opening degree of the main valve. At this time, the main valve element 30 stops at a valve-lift position. This valve-lift position is a position where three forces are all balanced thereamong. Here, the four forces are the force by the spring 44 in the valve opening direction, the force by the spring 42 in the valve closing direction, the solenoidal force by the solenoid 3 in the valve closing direction, and the opposing force, to oppose the solenoidal force, generated by the power element 6 operated according to the suction pressure Ps.

As, for example, the refrigeration load becomes large and the suction pressure Ps becomes higher than the set pressure Pset, the bellows 45 contracts with the result that the main valve element 30 is displaced relatively upward (in the valve closing direction). As a result, the opening degree of the main valve becomes small and therefore the compressor operates in such a manner as to increase the discharging capacity. As a result, a change is made in a direction where the suction pressure Ps drops. Conversely, as the refrigeration load becomes small and the suction pressure Ps becomes lower than the set pressure Pset, the bellows 45 expands. As a result, the biasing force by the power element 6 works in such a direction as to oppose the solenoidal force. As a result, the force toward the main valve element 30 in the valve closing direction is reduced and the opening degree of the main valve becomes large. Thus, the compressor operates in such a manner as to reduce the discharging capacity. As a result, the suction pressure Ps is maintained at the set pressure Pset.

If the engine load gets larger during such a steady control operation and therefore a reduction in the load to the air conditioner is desired, the conduction state (on/off) of the solenoid 3 is switched from on to off. This means that no suction power is in effect between the core 46 and the plunger 50. Thus the bellows 45 expands, the main valve element 30 gets separated away from the main valve seat 20 by the biasing force of the spring 44, and the main valve is fully opened. At this time, the sub-valve element 36 is seated on the sub-valve seat 34 and therefore the sub-valve is closed. At this time, the refrigerant, at the discharge pressure Pd, introduced into the port 14 from the discharge chamber Pd of the compressor passes through the fully opened main valve and flows into the crankcase from the port 12. Thus, the crank pressure Pc rises and then the compressor performs the minimum capacity operation.

When, in particular, the solenoid 3 is switched from on to off as in the above case, foreign materials, contained in the refrigerant, which have entered through the port 14 are more likely to be drawn into the sliding portion of the main valve element 30 relative to the guiding passage 24 when the main valve element 30 is opened. This is because immediately after the solenoid 3 has been switched from on to off, the pressure difference (Pd−Ps) in between the port 14 and the port 16 is relatively large and furthermore the main valve element 30 moves to such a direction along which the foreign material accumulated at an opening end of the guiding passage 24 at a high pressure side is drawn into the sliding portion. Then, there is a possibility that a locked state caused by the entanglement of the foreign material will occur when the solenoid 3 is switched again from off to on and thereby the main valve element 30 is displaced in the valve closing direction. The present embodiment provides an interlocking mechanism (lock release mechanism) capable of releasing such a locked state in the event that the locked state occurs. The opening and closing of the sub-valve element 36 is determined through a balance between three forces; here, the four forces are the force generated by the spring 44 in the valve closing direction, the force generated by the spring 42 in the valve opening direction, the solenoidal force generated by the solenoid 3 in the valve opening direction, and the opposing force, to oppose the solenoidal force, of the power element 6 exerted according to the suction pressure Ps. And the balance is so set as to close the sub-valve, when the suction pressure is lower than a predetermined suction pressure Ps value at a time other than at startup or the like. Thus, the setting of a set value (a set value with which to open the sub-valve) of the suction pressure Ps when the sub-valve is opened can be changed by a value of current supplied to the solenoid 3. Here, the "set value with which to open the sub-valve" will be hereinafter referred to as "sub-valve opening set value" also. In other words, the interlocking mechanism according to the present embodiment enables the sub-valve opening set value to be varied by the supply current to the solenoid 3 and has the locked state of the main valve element 30 released by the solenoidal force. Its details will be described hereunder.

FIGS. 5A to 5C and FIGS. 6A to 6C correspond to enlarged views of a circular region D of FIG. 2 and show exemplary operations of a lock release mechanism. FIGS. 5A to 5C and FIGS. 6A to 6C show its operational processes. For convenience, FIGS. 5A to 5C and FIGS. 6A to 6C each shows a left half of the enlarged view of the circular region D of FIG. 2. Black spots shown in FIGS. 5A to 5C and FIGS. 6A to 6C indicate foreign materials such as metallic powders.

As shown in FIG. 5A, the refrigerant discharged through the port 14 may contain the foreign materials (see the black tiny spots), and the foreign materials may enter the sliding portion of the main valve element 30 relative to the guiding passage 24 to prevent a smooth movement of the main valve element 30 and may eventually lock the main valve element 30 at the worst case. Since there is a relatively large pressure difference (Pd–Ps) in between the port 14 and port 16, the foreign material, which has entered through the port 14 tends to be drawn toward the opening in the guiding passage 24. And when the compressor is switched from on to off and then the main valve element 30 makes a large displacement toward a fully open state, the foreign material is more likely to be drawn toward the sliding portion.

As a result of such accumulation and adhesion of the foreign material to the sliding portion when the main valve is fully open, the foreign material may be entangled between the main valve element 30 and the guiding passage 24 when the compressor is again turned on. This may possibly lock the movement of the main valve element 30. In such a case, a weak structure having only the spring 42 capable of biasing the valves in the closing direction may not attain a drive force enough to push out the foreign material and move the main valve element 30 in the closing direction. Even though, in such a weak structure, the sub-valve can be opened, it is still difficult to start the compressor because the opening degree of the main valve is larger than that of the sub-valve.

In the light of the foregoing circumstances, in the present embodiment, the solenoidal force is directly transmitted to the main valve element 30 by way of the engagement portion 78, thereby releasing the locked state. By employing such a structure as this, a current exceeding the maximum current supplied during a steady control operation may be supplied so as to exert a larger load, thereby releasing the locked state. In other words, as shown in FIG. 5B, the actuating rod 38 is driven, by the solenoidal force, in the closing direction of the main valve if the foreign material is entangled in between the main valve element 30 and guiding passage 24. Although the sub-valve is supposed to maintain its closed state, the main valve element 30 is now locked. As a result, the actuating rod 38 is displaced relative to the main valve element 30, and the sub-valve element 36 is lifted from the sub-valve seat 34. That is, the sub-valve is opened before the main valve is closed. Despite this, the actuating rod 38 is driven here as it is and then the engagement portion 78 is butted against the actuating surface 76, thereby directly exerting the solenoidal force on the main valve element 30.

As a result, not only the biasing force of the spring 42 but also a large solenoidal force is exerted on the main valve element 30. Since, at this time, the spring 42 is compressed as well, the main valve element 30 is pressed by a biasing force that is greater than a set load set to perform a steady control. As a result, as shown in FIG. 5C, the locked state of the main valve element 30 caused by the foreign material entangled in the sliding portion is released and thereby the foreign material can be pushed out during a process in which the main valve element 30 is moved in the valve closing direction. The foreign material pushed out then floats in the valve chamber 26 as shown in FIG. 6A, for instance. At the same time, the main valve can be closed because the locked state of the main valve element 30 has been released. In this manner, when the locking is released during a process of moving the main valve element 30 in the closing direction of the main valve, the engagement portion 78 is separated away from the actuating surface 76 by the biasing force of the spring 42 with the result that the sub-valve is temporarily closed.

Then, as shown in FIG. 6B, further driving the actuating rod 38, after the closing of the main valve, allows the sub-valve to be opened as it should be, so that the refrigerant can be escaped from the crankcase to the suction chamber (see a bold arrow in FIG. 6B). This starts the compressor, and when the main valve is opened as shown in FIG. 6C, the refrigerant can be supplied from the discharge chamber to the crankcase. At this time, the floating foreign materials as shown in FIG. 6C can be discharged together with the refrigerant (see a bold arrow in FIG. 6C) by way of the main valve. It is anticipated here that, depending on the adhesion status of the foreign materials to the main valve element 30, not all of the foreign materials will not be pealed off or removed completely although the locked state caused by the foreign materials can be cancelled. However, releasing the locking like this ensures the function of the control valve 1. Also, it is anticipated that the remaining foreign material can be gradually removed during a process in which the on and off of the solenoid 3 is repeated.

By employing the present embodiment as described above, the lock release mechanism by the solenoidal force works even if the entry of foreign material into the guiding passage 24 when the main valve is opened causes the main valve element 30 to be locked. If the locked state cannot be released when the maximum current is supplied during a steady control operation, the locking can be released if a larger solenoidal force is exerted by supplying an additional current to the solenoid 3. Thereby, the biasing force as a result of a drive of the actuating rod 38 works in a direction that closes the main valve relative to the main valve element 30 (i.e., in a direction that releases the locking) and, at the same time, works in a direction that opens the sub-valve relative to the sub-valve element 36 (i.e., in a direction that enables the sub-valve). In other words, both the function to release the locked state of the main valve element 30 and the function to open/close the sub-valve (the function of varying the sub-valve opening set value by a supply current value) can be activated simultaneously. This not only allows the locking to be reliably released but also opens the sub-valve so as to start the compressor normally.

[Modification]

Figure 7:
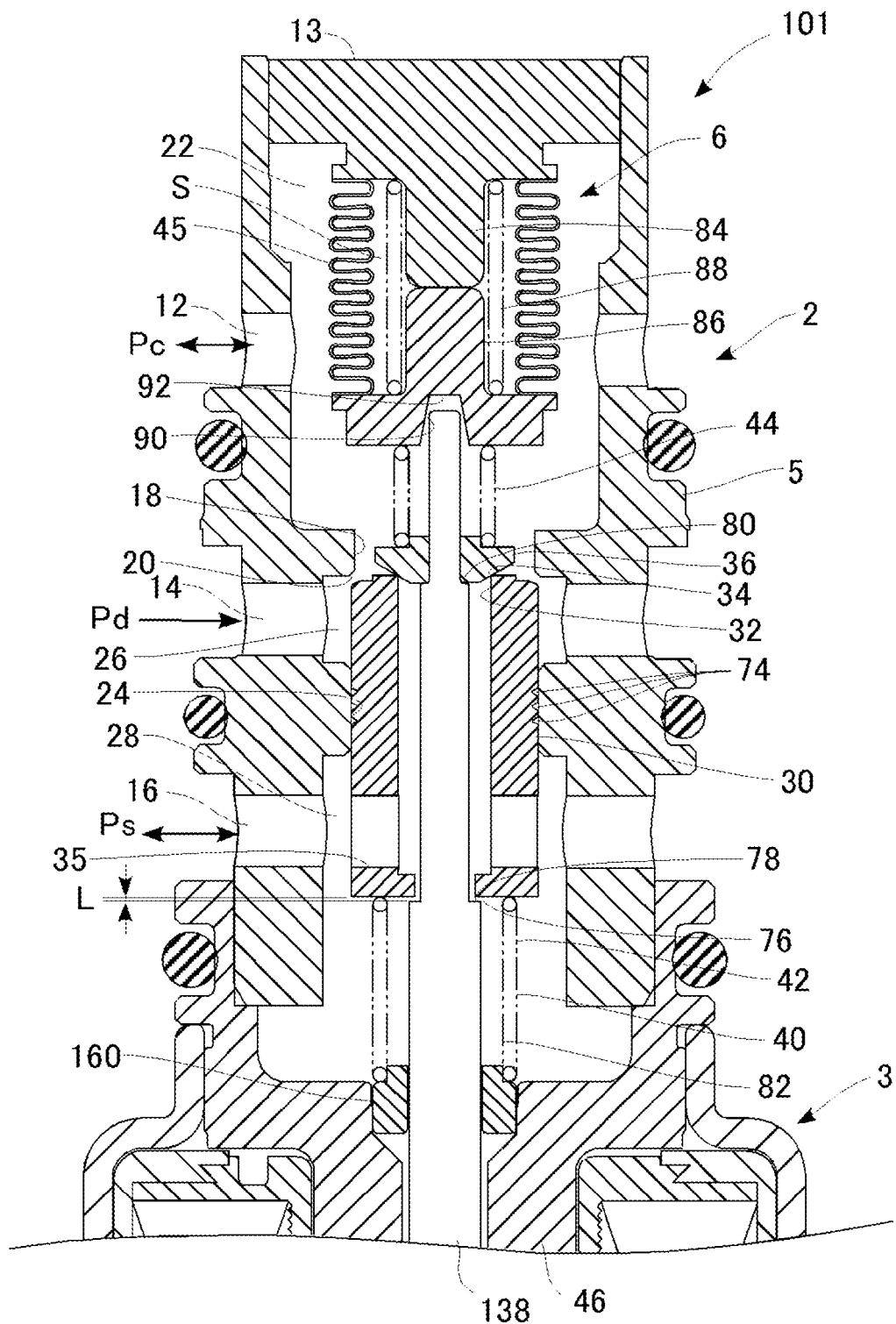
FIG. 7 is a partially enlarged sectional view of the upper half of a control valve according to a modification.

FIG. 7 is a partially enlarged sectional view of the upper half of a control valve according to a modification. FIG. 7 corresponds to FIG. 2. Note that the structural components in FIG. 7 closely similar to those of the first embodiment are given the identical reference numerals. A control valve 101 according to the present modification is configured such that the spring 42 is set between the main valve element 30 and the solenoid 3 instead of the spring 42 being directly supported by an actuating rod 138. More specifically, the spring 42 is set between a shaft support member 160, which is press-fitted on the upper end of the core 46, and the main valve element 30. In such a structure as this, too, the sub-valve can be opened by supplying the current to the solenoid 3 when the foreign material is entangled between the main valve element 30 and the guiding passage 24. And the main valve element 30 can be directly pushed using the stepped portions of the actuating rod 138 so as to release the locking.

Second Embodiment

Figure 8:
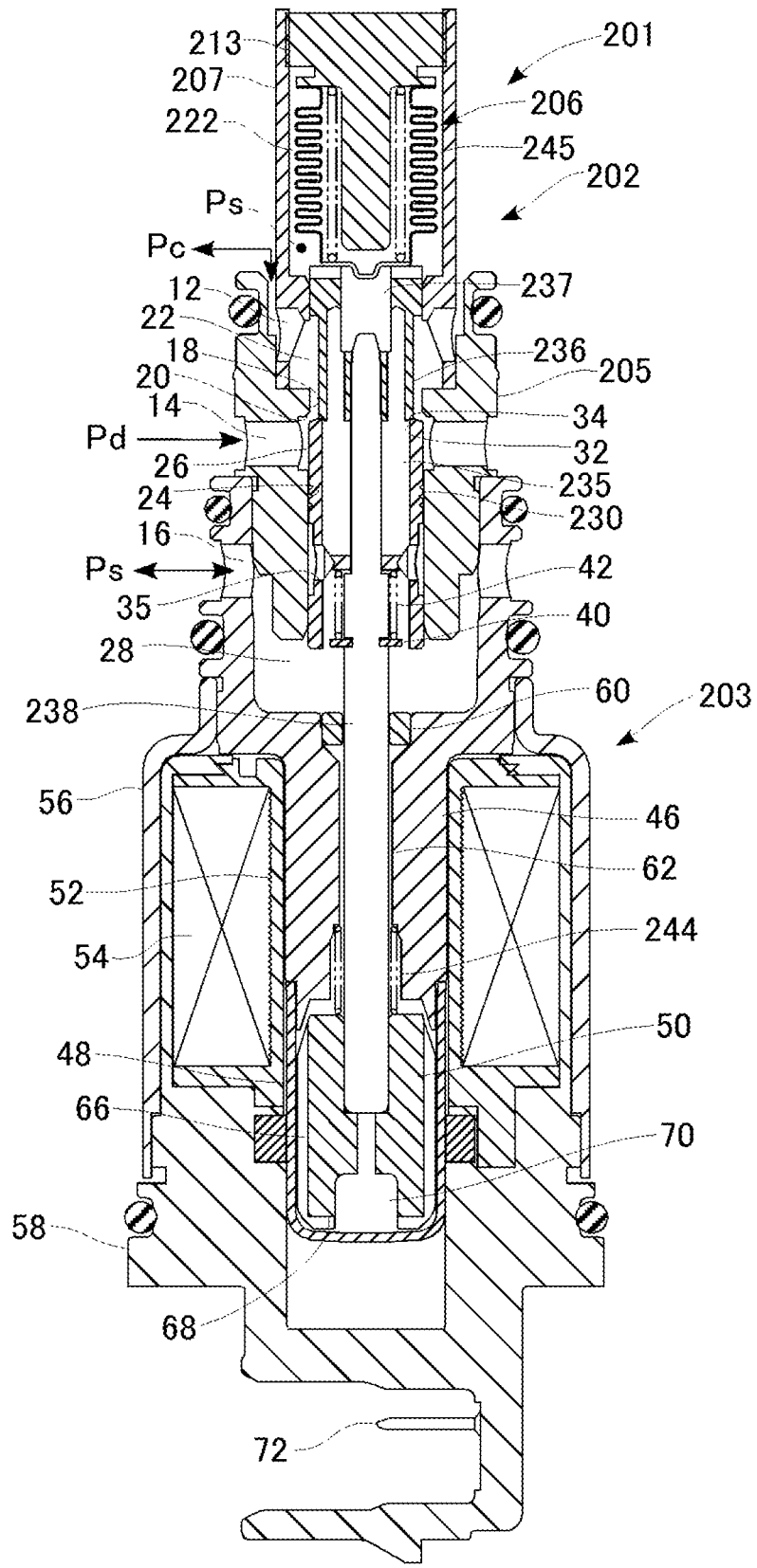
FIG. 8 is a cross-sectional view showing a structure of a control valve according to second embodiment.
Figure 9:
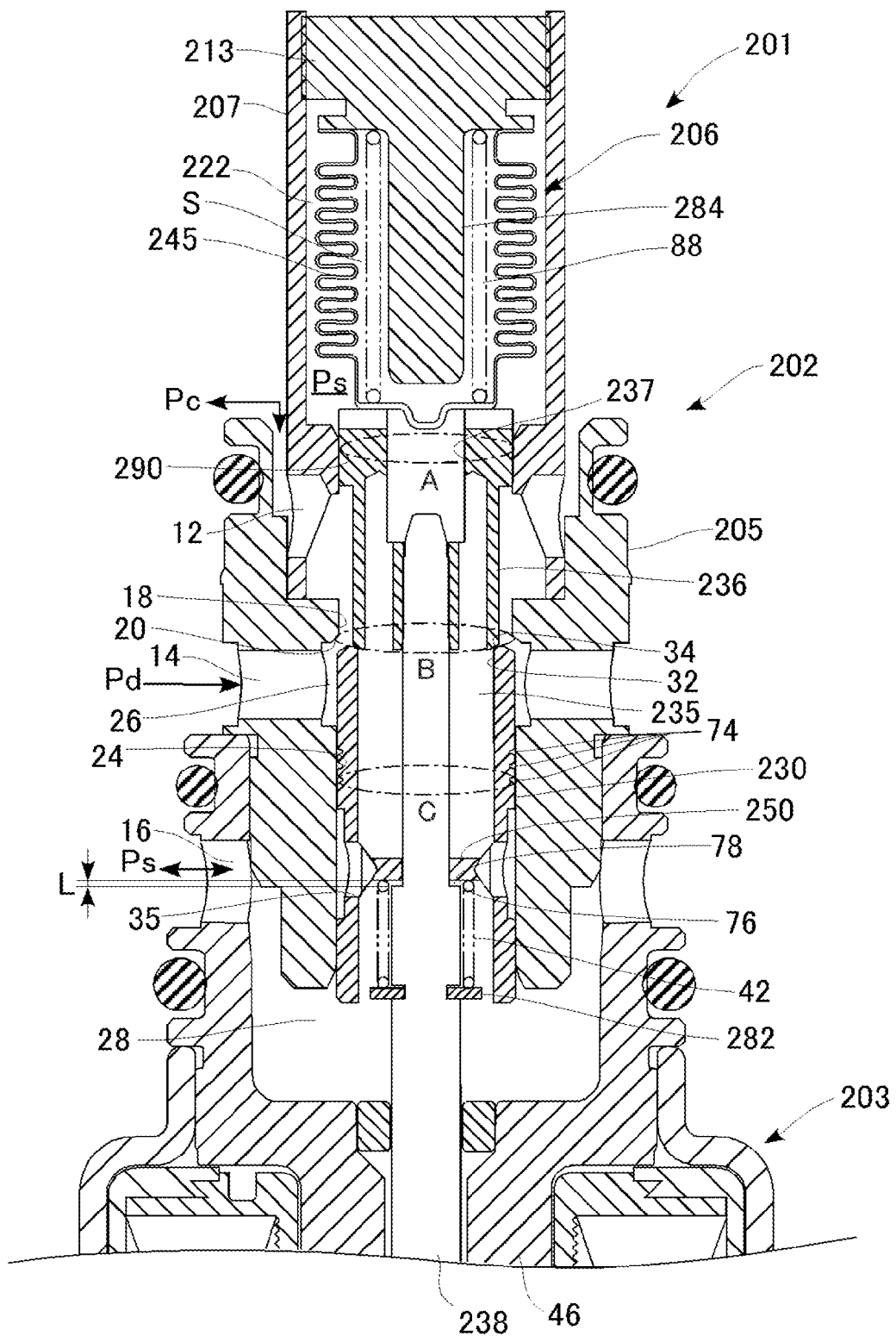
FIG. 9 is a partially enlarged sectional view of the upper half of FIG. 8.

FIG. 8 is a cross-sectional view showing a structure of a control valve according to second embodiment. FIG. 9 is a partially enlarged sectional view of the upper half of FIG. 8. The control valve according to the second embodiment differs from the first embodiment in the structure of the valve unit. Thus, a description is hereinbelow given centering around different features therefrom. Note that the structural components in FIG. 8 and FIG. 9 closely similar to those of the first embodiment are given the identical reference numerals.

As shown in FIG. 8, a control valve 201 is constituted as a Ps sensing valve. However, a power element 206 does not sense the crank pressure Pc but directly senses the suction pressure Ps, instead. The control valve 201 according to the second embodiment differs from the first embodiment in this respect. The control valve 201 is constituted by integrally assembling a valve unit 202 and a solenoid 203. In the present embodiment, too, a body 205, a housing 207, a core 46, a casing 56 and an end member 58 form a body for the whole control valve 201.

The power element 206, having the cylindrical housing 207, is so secured as to seal off an upper-end opening of the body 205. An upper end opening of the housing 207 is sealed by an end member 213, and a sub-valve element 236 is slidably supported at a lower end opening of the housing 207. A port 12 is provided at a connection between the body 205 and the housing 207. The sub-valve element 236 is press-fitted and fixed to an upper end of the actuating rod 238. And the spring for directly biasing the sub-valve element 236 in a closing direction of the sub-valve is not provided in the second embodiment, which differs from the first embodiment. On the other hand, a spring 244 (functioning as a "biasing member") that biases force in a direction separating the plunger 50 from the core 46 is set between the plunger 50 and the core 46.

A communicating hole 237, which runs through the sub-valve element 236 in the direction of axis line, is formed in the sub-valve element 236. As a result, a communicating path 235 that communicates a pressure chamber 222 in the housing 207 with a pressure chamber 28 is formed between a main valve element 230 and a sub-valve element 236. By employing such a structure as this, the suction pressure Ps led in through the port 16 is also led into the housing 207 through the communicating path 235, so that the suction pressure Ps is directly sensed by the power element 206.

As shown in FIG. 9, a dividing wall 250 is provided in a middle part of the main valve element 230 along the direction of axis line, and the underside of the dividing wall 250 is the actuating surface 76. The actuating rod 238 penetrates an insertion hole provided in a central part of the dividing wall 250, and the engagement portion 78 is formed by a stepped portion provided near the actuating surface 76. In the second embodiment, too, the position of the stepped portion is set such that the engagement portion 78 is spaced apart from the actuating surface 76 at a predetermined interval L, while the sub-valve element 236 is seated on the sub-valve seat 34 as shown in FIG. 9. A retaining ring 282 is fitted to an approximately midway part of the actuating rod 38, and a spring 42 is set between the retaining ring 282 and the dividing wall 250. The sub-valve element 236 is slidably supported by a guiding passage 290 provided near a low end of the housing 207. The communicating hole 35, which communicates the inside and outside of the main valve element 230, is provided on a lateral side near the dividing wall 250 in the main valve element 230.

As the solenoidal force is increased, the actuating rod 238 resisting the biasing force of the spring 42 is displaced relative to the main valve element 230 and thereby the sub-valve element 236 is lifted from the sub-valve seat 34 so as to open the sub-valve. Also, the solenoidal force can be directly conveyed to the main valve element 230 with the engagement portion 78 and the actuating surface 76 being engaged with (abutted against) each other, so that the main valve element 230 can be pressed in a closing direction of the main valve with a force greater than the biasing force of the spring 42. This structure functions as a lock release mechanism (interlocking mechanism) that releases a locked state where the main valve element 230 is locked as a result of the entanglement of foreign material in the sliding portion of the main valve element 230 relative to the guiding passage 24.

The power element 206 is so structured that an upper end opening of a bottomed cylindrical bellows 245 is closed by a stopper 284 ("base member"). The stopper 284 is formed integrally with the end member 213. The bellows 245 abuts against an upper end surface of the sub-valve element 236 at a bottom face of the bellows 245 in a detachable manner. The spring 88 biases the bellows 245 in a direction that expands the bellows 245. The bellows 245 expands or contracts in the direction of axis line (opening/closing direction of the main valve and the sub-valve) according to the pressure difference between the suction pressure Ps of the pressure chamber 222 and the reference pressure of the reference pressure chamber S. However, if the pressure difference becomes large, the bottom face of the bellows 245 will abut against the underside of the stopper 284 and will be stopped thereby at a predetermined contraction of the bellows 245, thus restricting the contraction.

According to the second embodiment, an effective pressure-receiving diameter A of the sliding portion of the sub-valve element 236, an effective pressure-receiving diameter B of the main valve element 230 in the main valve, and an effective pressure-receiving diameter C of the sliding portion of the main valve element 230 are set equal to each other. Thus, the effect of the discharge pressure Pd, the crank pressure Pc and the suction pressure Ps acting on a combined unit of the main valve element 230 and the sub-valve element 236 is cancelled. As a result, when the main valve is under control, the main valve element 230 is opened or closed according to the suction pressure Ps received at the pressure chamber 222. That is, the control valve 201 functions as the so-called Ps sensing valve.

In such a structure as described above, the main valve operates autonomously so that, in a stable control state of the control valve 201, the suction pressure Ps of the pressure chamber 222 becomes a predetermined set pressure Pset. The set pressure Pset is basically adjusted beforehand by the spring loads of the springs 42, 244 and 88. The set pressure Pset can be changed by varying the supply current (set current) to the solenoid 203.

Third Embodiment

Figure 10:
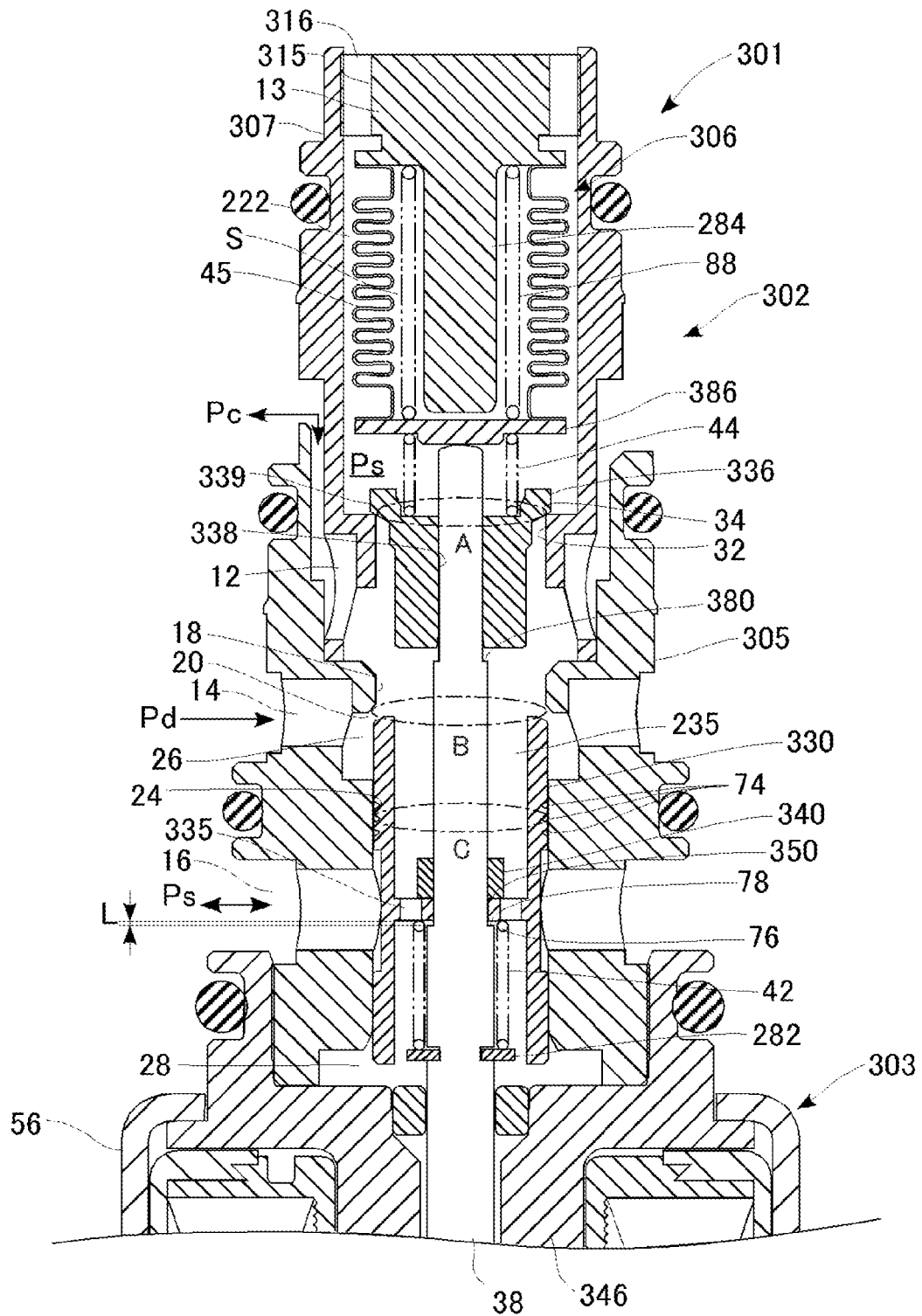
FIG. 10 is a partially enlarged sectional view of the upper half of a control valve according to a third embodiment.

FIG. 10 is a partially enlarged sectional view of the upper half of a control valve according to a third embodiment. The control valve according to the third embodiment differs from the first and second embodiments in the structure of the valve unit. Thus, a description is hereinbelow given centering around different features therefrom. Note that the structural components in FIG. 10 closely similar to those of the first and second embodiments are given the identical reference numerals.

A control valve 301 shares the same feature, where a power element 306 directly senses the suction pressure Ps, as the second embodiment and differs from the first and second embodiments in that the sub-valve seat 34 is provided in a housing 307 instead of in a main valve element 330. The control valve 301 is constituted by integrally assembling a valve unit 302 and a solenoid 303. In the present embodiment, too, a body 305, a housing 307, a core 346, a casing 56 and an end member 58 form a body for the whole control valve 301.

A plurality of through-holes 335, through which the refrigerants pass, are formed in a dividing wall 350. A cylindrical stopper 340 is press-fitted in a middle of the actuating rod 38. Thus, the relative moving range of the dividing wall 350 is restricted by the engagement portion 78 and the stopper 340. FIG. 10 shows that the dividing wall 350 is in contact with the stopper 340 and that the main valve element 330 is located at a top dead point relative to the actuating rod 38. By employing such a structure like this, although the actuating rod 38 is pushed down by the biasing force of the spring 244 (see FIG. 8) while the solenoid 303 is not electrically conducting, the stopper 340 then abuts against the dividing wall 350 and biases the main valve element 330 in the valve opening direction. As a result, as shown in FIG. 10, the main valve is fully opened.

The diameter of a lower portion of the housing 307 is reduced, and the sub-valve hole 32 is formed inside the lower portion thereof. The sub-valve seat 34 is formed in the upper-end opening of the sub-valve hole 32. A sub-valve element 336 is of a stepped cylindrical shape, and a through-hole 338 is formed along the axis line thereof. The upper end of the actuating rod 38 connects to the power element 306 such that the actuating rod 38 penetrates the through-hole 338. The sub-valve element 336 is disposed such that the body thereof penetrates the sub-valve hole 32, and an upper end thereof extends radially outward so as to constitute an attaching/detaching portion 339. The attaching/detaching portion 339 touches and leaves the sub-valve seat 34 from a pressure chamber 222 side so as to close and open the sub-valve, respectively.

A stepped portion provided in an upper portion of the actuating rod 38 functions as a pressing portion 380. More specifically, the pressing portion 380 is spaced apart from the sub-valve element 336 in a state as shown in FIG. 10. And if, however, the actuating rod 38 is displaced relative to the body 305, the stepped portion will be engaged with the bottom face of the sub-valve element 336, so that the solenoidal force in the opening direction of the sub-valve can be directly transmitted to the sub-valve element 336.

The power element 306 is structured such that the bottom of the bellows 45 is sealed by a discoidal stopper 386. The bottom of the stopper 386 is a flat surface but the upper end surface of the actuating rod 38 is of an R shape. Accordingly, the actuating rod 38 is almost in point-contact with the stopper 386 when the actuating rod 38 is operatively coupled to the power element 306. Thus, even if a lateral load is exerted on one of the actuating rod 38 and the power element 306, the lateral load will be less likely to affect the other thereof, so that the movement of each valve element to be operatively coupled can be stably kept. The spring 44 is set between the sub-valve element 336 and the stopper 386.

A plurality of communicating grooves 315 are provided on the outer periphery of the end member 13, and a port 316 is formed between the housing 307 and the communicating grooves 315. The port 316 functions as a "suction chamber communicating port" that communicates with the suction chamber in addition to the port 16. The refrigerant, having the suction pressure Ps, which has passed through the sub-valve is led out to the suction chamber by way of the port 316. Though the port 16 communicates with the suction chamber in the present embodiment, too, the suction pressure Ps of the port 16 will not be led into the pressure chamber 28. The pressure chamber 28 is filled with the refrigerant having the crank pressure Pc led in or out from the port 12.

As, in this structure, the solenoidal force is increased, the actuating rod 38 is displaced relative to the body 305 and thereby the sub-valve element 336 is lifted from the sub-valve seat 34 so as to open the sub-valve. Also, the solenoidal force can be directly conveyed to the main valve element 330 with the engagement portion 78 and the actuating surface 76 being engaged with (abutted against) each other, so that the main valve element 330 can be pressed in a closing direction of the main valve with a force greater than the biasing force of the spring 42. This structure functions as a lock release mechanism (interlocking mechanism, pressing mechanism, etc.) that releases the locked state where the main valve element 330 is locked as a result of the entanglement of foreign material in the sliding portion of the main valve element 330 relative to the guiding passage 24.

According to the third embodiment, an effective pressure-receiving diameter B of the main valve element 330 in the main valve and an effective pressure-receiving diameter C of the sliding portion of the main valve element 330 are set equal to each other. Thus, the effect of the discharge pressure Pd, the crank pressure Pc and the suction pressure Ps acting on the main valve element 330 is cancelled. As a result, when the main valve is under control, the main valve element 330 is opened or closed according to the suction pressure Ps of the pressure chamber 222. That is, the control valve 301 functions as the so-called Ps sensing valve.

According to the third embodiment, the sub-valve element 336 will not operate integrally with the main valve element 330 while the main valve is in a controlled state. When the main valve element 330 is seated on the main valve seat 20 and furthermore the actuating rod 38 is driven upward, the pressing portion 380 is engaged with the sub-valve element 336, thereby pressing the sub-valve element 336. As a result, the sub-valve element 336 gets separated away from the sub-valve seat 34 so as to allow the sub-valve to be opened. In this manner, providing the sub-valve seat 34 in the body of the control valve 301 instead of in the main valve element 330 enables the size of the sub-valve hole 32 to be set regardless of the main valve element 330. Thus the flow rate of refrigerant can be increased with a larger sub-valve, so that the bleed function can be enhanced. Although, in the present embodiment, the effective pressure-receiving diameter A of the sub-valve element 336 in the sub-valve and the effective pressure-receiving diameter B of the main valve element 330 in the main valve are set equal to each other, the effective pressure-receiving diameter A may be set larger than the effective pressure-receiving diameter B.

The description of the present invention given above is based upon illustrative embodiments. These embodiments are intended to be illustrative only and it will be obvious to those skilled in the art that various modifications could be further developed within the technical idea underlying the present invention and that such additional modifications are also within the scope of the present invention.

In each of the above-described embodiments, the engagement portion 78 is constructed using a stepped portion provided in the actuating rod 38 (238). And the actuating rod 38 (238) is structured such that the actuating surface 76 of the main valve element 30 (230) is directly pressed by the engagement portion 78. In a modification, the structure may be such that the spring load or spring constant of the spring 42, for example, is sufficiently raised and the thus increased solenoidal force is transmitted to the main valve element 30 (230, 330) while the solenoidal force is transmitted by way of the spring 42 (elastic body). In other words, the structure may be such that as the solenoidal force increases after the main valve element 30 (230, 330) has been locked, the spring load of the spring 42 is raised to a value greater than the set load (the load set for a steady control operation) and therefore the locking can be released.

That is, although it is preferable that the solenoidal force be directly exerted on the main valve element 30 (230, 330), the structure, where it is indirectly exerted by way of the elastic body in this manner, still allows the locking to be released if the spring load greater than the valve-opening load of the main valve element 30 (230, 330) is given. Also, sine the main valve element and the actuating rod can be displaced relative to each other trough the medium of the elastic body, the sub-valve can be opened by supplying the current to the solenoid. That is, releasing the locking by exerting the solenoidal force and opening/closing the sub-valve can both be achieved. By employing such a structure, the actuating rod 38 (238) can be constructed using a simple shape while provision of the engagement portion 78 is eliminated. Suppose now that, as in the first embodiment, the actuating rod and the sub-valve element are not fixed and that the spring load of the spring 42 is received at the spring 44 by way of the sub-valve element. In this case, it will be hard to keep balance between the spring 42 and the spring 44 (244) and therefore it may possibly be difficult to maintain the opened state of the main valve while the solenoid 3 (230) is turned off. If such a point is taken into consideration, the structure as in the above-described embodiments where the actuating surface 76 thereof is pressed by the stepped portion may be more preferable than the present modification.

In the above-described first embodiment, the power element 6 is placed in the working chamber 22, which is filled with the refrigerant at the crank pressure Pc, as the control valve 1; at the same time, the control valve 1 is constituted as the so-called Ps sensing valve, which is enabled upon practically sensing the suction pressure Ps, by employing the structure where the crank pressure Pc is cancelled. In a modification, the power element 6 may be placed in the pressure chamber, which is filled with the refrigerant at the suction pressure Ps, and may be constituted as the so-called Ps sensing valve, which is enabled upon directly sensing the suction pressure Ps. For example, the working chamber 22 shown in FIG. 2 is vertically divided into an upper pressure chamber and a lower pressure chamber. Then, the power element 6 may be placed in the upper pressure chamber into which the suction pressure Ps is led, and the lower pressure chamber may be used as the working chamber 22, which is filled with the refrigerant having the crank pressure Pc. It is preferable that the actuating rod 38 is so provided as to penetrate the partition while a necessary sealing property is ensured.

In each of the above-described embodiments, the so-called Ps sensing valve, which is enabled upon sensing the suction pressure Ps, is described as a control valve. Instead, the control valve may be constituted as a so-called Pc sensing valve, which is enabled upon sensing the crank pressure Pc. In such a case, the structure will be such that the port 16 communicates with the crankcase.

In the above-described embodiments, the description has been given of examples where the bellows 45 (245) is used for a pressure-sensing member that constitutes the power element 6 (206, 306). In a modification, a diaphragm may be used, instead. In this case, the structure may be preferably such that a plurality of diaphragms are coupled in the direction of axis line in order to ensure a necessary running stroke required for the pressure-sensing member.

In each of the above-described embodiments, a description has been given of an example where a single port 12 is provided as the "crankcase communication port" (lead-in/out port) that communicates with the crankcase. In a modification, the crankcase communication port may be structured that it is divided into a first port (lead-out port), which is used to lead the refrigerant of the working chamber 22 out to the crankcase, and a second port (lead-in port), which is used to lead the refrigerant of the crankcase into the working chamber 22.

In the above-described embodiments, the description has been given on the assumption that the main valve element 30 has been locked; it goes without saying that achievable is the structure where the sub-valve is opened by the solenoidal force after the main valve has been closed, even in a situation where no locking occurs. That is, according to the above-described embodiments, the sub-valve can be opened, at a value of suction pressure Ps in accordance with the solenoid current, after the main valve has been closed, under a normally controlled state where no locking occurs. It may be rephrased or differently stated here that the above-described embodiments can be already sufficiently characterized by the structure where the sub-valve can be opened after the closing of the main valve.

In the above-described embodiments, the description has been given of examples where a spring (coil spring) is used as the biasing member regarding the springs 42, 44, 88, 244 and the like. It goes without saying that an elastic material, such as rubber or resin, or an elastic mechanism, such as a plate spring, may be used instead.

In the above-described embodiments, the power element 6 (206, 306) is indispensable for the structure of the composite valve. However, this should not be considered as limiting and the above-described lock release mechanism (interlocking mechanism) is applicable to a control valve having no such a pressure-sensing section. In such a case, however, a solenoid is provided as the driver part of the control valve.

The description has been given of examples where the above-described lock release mechanism (interlocking mechanism) is applied to the control valve for a variable displacement compressor. In a modification, the above-described lock release mechanism (interlocking mechanism) is applicable to a composite valve, such as a three-way valve under other modes, as long as a main valve and a sub-valve are provided in a common body and it is driven by a single solenoid.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:

1. A composite valve comprising:
   a body having a lead-in port through which a working fluid is led in, a lead-out port through which the working fluid is led out, and a lead-in/out port through which the working fluid is led out while the lead-in/out port communicates with the lead-in port and through which the working fluid is led in while the lead-in/out port communicates with the lead-out port;
   a main valve provided in a main passage that communicates between the lead-in port and the lead-in/out port;
   a sub-valve provided in a sub-passage that communicates between the lead-in/out port and the lead-out port;
   a main valve element configured to open and close the main valve by touching and leaving a main valve seat provided in the main passage, the main valve element being slidably supported by a guiding passage provided in the body;
   a sub-valve element configured to open and close the sub-valve by touching and leaving a sub-valve seat provided in the sub-passage;
   a solenoid including a core fixed to the body, and a plunger disposed opposite to the main valve element with respect to the core, the plunger being displaceable in a direction of axis line, the solenoid being configured to generate a suction force, having a magnitude corresponding to an amount of current supplied, between the core and the plunger, the suction force being a solenoidal force in a closing direction of the main valve, which is an opening direction of the sub-valve;
   an actuating rod configured to be capable of directly or indirectly transmitting the solenoidal force to the main valve element and the sub-valve element, the actuating rod being coupled to the plunger;
   a biasing member configured to bias the main valve element in the closing direction of the main valve so that the actuating rod and the main valve element are kept in a state in which the actuating rod and the main valve element are not displaced relative to each other in the direction of axis line while the main valve element is normally slidable along the guiding passage, the biasing member being made of an elastic material; and
   an interlocking mechanism including the actuating rod, the interlocking mechanism being configured to continuously perform a first operation of opening the sub-valve in a manner such that the actuating rod is displaced integrally with the sub-valve element in accordance with a magnitude of the solenoidal force and a second operation of increasing a pressing load, by which to press the main valve element in the closing direction of the main valve, in a manner such that the actuating rod is displaced relative to the main valve element after the opening of the sub-valve starts, in accordance with a magnitude of the solenoidal force,
   wherein as the solenoidal force is increased while the main valve element is incapable of normally sliding along the guiding passage, the pressing load of the actuating rod pressing the main valve element in the closing direction of the main valve is increased in such a manner that the actuating rod is driven in the opening direction of the sub-valve, which is the closing direction of the main valve, to press the sub-valve element up from the sub-valve seat so that the actuating rod is displaced relative to the main valve element in the closing direction of the main valve, and
   wherein the sub-valve element has a through-hole formed in the direction of axis line, through which an end of the actuating rod farther from the plunger is inserted.

2. A composite valve according to claim 1, wherein the sub-passage is so provided as to run through the main valve element, and
   wherein the sub-valve seat is formed in the main valve element.

3. A composite valve according to claim 1, wherein the actuating rod has an engagement portion provided integrally therewith, the engagement portion being formed such that the solenoidal force is directly transmitted to the main valve element by engaging the engagement portion with a to-be-engaged portion provided integrally with the main valve element, and
   wherein the interlocking mechanism is configured such that the actuating rod is displaced relative to the main valve element so as to engage the engagement portion with the to-be-engaged portion and such that the solenoidal force is directly exerted on the main valve element.

4. A composite valve according to claim 3, wherein the biasing member biases the main valve element in the closing direction of the main valve such that a predetermined interval is formed between the engagement portion and the to-be-engaged portion while the sub-valve is closed.

5. A composite valve according to claim 4, wherein the predetermined interval while the sub-valve is closed is equal to an uplift amount of the sub-valve element from the sub-valve seat while the sub-valve is fully open.

6. A composite valve according to claim 5, wherein the biasing member is set between a part integrated with the actuating rod and the main valve element, and the biasing member is so configured as to be displaceable integrally with the actuating rod,
   wherein the interlocking mechanism further includes the biasing member, and
   wherein when movement of the main valve element in the closing direction of the main valve is restricted, the interlocking mechanism displaces the actuating rod relative to the main valve element in the closing direction of the main valve as the solenoidal force is increased, so as to compress the biasing member such that a pressing load of the biasing member pressing the main valve element in the valve closing direction of the main valve, is made larger than a pressing load of the biasing member in a state where the sub-valve is closed.

7. A composite valve according to claim 6, wherein the composite valve is configured as a control valve for a variable displacement compressor where a discharging capacity of the variable displacement compressor, which compresses a refrigerant introduced into a suction chamber and then discharges the compressed refrigerant from a discharge chamber, is varied by controlling a flow rate of the refrigerant to be introduced from the discharge chamber into a crankcase, the control valve for the variable displacement compressor including:
the body having a crankcase communication port that communicates with the crankcase as the lead-in/out port, a discharge chamber communication port that communicates with the discharge chamber as the lead-in port, and a suction chamber communication port that communicates with the suction chamber as the lead-out port; and
a pressure-sensing section configured to sense a suction pressure of the suction chamber or a crank pressure of the crankcase as a pressure to be sensed and configured to exert a valve-opening-direction force on the main valve element via the actuating rod when the pressure to be sensed is lower than a set pressure.

8. A composite valve according to claim 5, wherein the composite valve is configured as a control valve for a variable displacement compressor where a discharging capacity of the variable displacement compressor, which compresses a refrigerant introduced into a suction chamber and then discharges the compressed refrigerant from a discharge chamber, is varied by controlling a flow rate of the refrigerant to be introduced from the discharge chamber into a crankcase, the control valve for the variable displacement compressor including:
the body having a crankcase communication port that communicates with the crankcase as the lead-in/out port, a discharge chamber communication port that communicates with the discharge chamber as the lead-in port, and a suction chamber communication port that communicates with the suction chamber as the lead-out port; and
a pressure-sensing section configured to sense a suction pressure of the suction chamber or a crank pressure of the crankcase as a pressure to be sensed and configured to exert a valve-opening-direction force on the main valve element via the actuating rod when the pressure to be sensed is lower than a set pressure.

9. A composite valve according to claim 4, wherein the biasing member is set between a part integrated with the actuating rod and the main valve element, and the biasing member is so configured as to be displaceable integrally with the actuating rod,
wherein the interlocking mechanism further includes the biasing member, and
wherein when movement of the main valve element in the closing direction of the main valve is restricted, the interlocking mechanism displaces the actuating rod relative to the main valve element in the closing direction of the main valve as the solenoidal force is increased, so as to compress the biasing member such that a pressing load of the biasing member pressing the main valve element in the valve closing direction of the main valve, is made larger than a pressing load of the biasing member in a state where the sub-valve is closed.

10. A composite valve according to claim 4, wherein the composite valve is configured as a control valve for a variable displacement compressor where a discharging capacity of the variable displacement compressor, which compresses a refrigerant introduced into a suction chamber and then discharges the compressed refrigerant from a discharge chamber, is varied by controlling a flow rate of the refrigerant to be introduced from the discharge chamber into a crankcase, the control valve for the variable displacement compressor including:
the body having a crankcase communication port that communicates with the crankcase as the lead-in/out port, a discharge chamber communication port that communicates with the discharge chamber as the lead-in port, and a suction chamber communication port that communicates with the suction chamber as the lead-out port; and
a pressure-sensing section configured to sense a suction pressure of the suction chamber or a crank pressure of the crankcase as a pressure to be sensed and configured to exert a valve-opening-direction force on the main valve element via the actuating rod when the pressure to be sensed is lower than a set pressure.

11. A composite valve according to claim 3, wherein the biasing member is set between a part integrated with the actuating rod and the main valve element, and the biasing member is so configured as to be displaceable integrally with the actuating rod,
wherein the interlocking mechanism further includes the biasing member, and
wherein when movement of the main valve element in the closing direction of the main valve is restricted, the interlocking mechanism displaces the actuating rod relative to the main valve element in the closing direction of the main valve as the solenoidal force is increased, so as to compress the biasing member such that a pressing load of the biasing member pressing the main valve element in the valve closing direction of the main valve, is made larger than a pressing load of the biasing member in a state where the sub-valve is closed.

12. A composite valve according to claim 3, wherein the composite valve is configured as a control valve for a variable displacement compressor where a discharging capacity of the variable displacement compressor, which compresses a refrigerant introduced into a suction chamber and then discharges the compressed refrigerant from a discharge chamber, is varied by controlling a flow rate of the refrigerant to be introduced from the discharge chamber into a crankcase, the control valve for the variable displacement compressor including:
the body having a crankcase communication port that communicates with the crankcase as the lead-in/out port, a discharge chamber communication port that communicates with the discharge chamber as the lead-in port, and a suction chamber communication port that communicates with the suction chamber as the lead-out port; and
a pressure-sensing section configured to sense a suction pressure of the suction chamber or a crank pressure of the crankcase as a pressure to be sensed and configured to exert a valve-opening-direction force on the main valve element via the actuating rod when the pressure to be sensed is lower than a set pressure.

13. A composite valve according to claim 1, wherein the biasing member is set between a part integrated with the actuating rod and the main valve element, and the biasing member is so configured as to be displaceable integrally with the actuating rod,
wherein the interlocking mechanism further includes the biasing member, and
wherein when movement of the main valve element in the closing direction of the main valve is restricted, the interlocking mechanism displaces the actuating rod relative to the main valve element in the closing direction of the main valve as the solenoidal force is increased, so as to compress the biasing member such that a pressing load of the biasing member pressing the main valve element in the valve closing direction of the main valve, is made larger than a pressing load of the biasing member in a state where the sub-valve is closed.

14. A composite valve according to claim 13, wherein the composite valve is configured as a control valve for a variable displacement compressor where a discharging capacity of the variable displacement compressor, which compresses a refrigerant introduced into a suction chamber and then discharges the compressed refrigerant from a discharge chamber, is varied by controlling a flow rate of the refrigerant to be introduced from the discharge chamber into a crankcase,
the control valve for the variable displacement compressor including:
the body having a crankcase communication port that communicates with the crankcase as the lead-in/out port, a discharge chamber communication port that communicates with the discharge chamber as the lead-in port, and a suction chamber communication port that communicates with the suction chamber as the lead-out port; and
a pressure-sensing section configured to sense a suction pressure of the suction chamber or a crank pressure of the crankcase as a pressure to be sensed and configured to exert a valve-opening-direction force on the main valve element via the actuating rod when the pressure to be sensed is lower than a set pressure.

15. A composite valve according to claim 1, wherein when the main valve element moves in a closing direction of the main valve, a sliding portion of the main valve element is so configured as to partially protrude on a high-pressure side of the guiding passage.

16. A composite valve according to claim 1, wherein the composite valve is configured as a control valve for a variable displacement compressor where a discharging capacity of the variable displacement compressor, which compresses a refrigerant introduced into a suction chamber and then discharges the compressed refrigerant from a discharge chamber, is varied by controlling a flow rate of the refrigerant to be introduced from the discharge chamber into a crankcase,
the control valve for the variable displacement compressor including:
the body having a crankcase communication port that communicates with the crankcase as the lead-in/out port, a discharge chamber communication port that communicates with the discharge chamber as the lead-in port, and a suction chamber communication port that communicates with the suction chamber as the lead-out port; and
a pressure-sensing section configured to sense a suction pressure of the suction chamber or a crank pressure of the crankcase as a pressure to be sensed and configured to exert a valve-opening-direction force on the main valve element via the actuating rod when the pressure to be sensed is lower than a set pressure.

17. A composite valve comprising:
a body having a lead-in port through which a working fluid is led in, a lead-out port through which the working fluid is led out, and a lead-in/out port through which the working fluid is led out while the lead-in/out port communicates with the lead-in port and through which the working fluid is led in while the lead-in/out port communicates with the lead-out port;
a main valve provided in a main passage that communicates between the lead-in port and the lead-in/out port;
a sub-valve provided in a sub-passage that communicates between the lead-in/out port and the lead-out port;
a main valve element configured to open and close the main valve by touching and leaving a main valve seat provided in the main passage, the main valve element being slidably supported by a guiding passage provided in the body;
a sub-valve element configured to open and close the sub-valve by touching and leaving a sub-valve seat provided in the sub-passage;
a solenoid including a core fixed to the body, and a plunger disposed opposite to the main valve element with respect to the core, the plunger being displaceable in a direction of axis line, the solenoid being configured to generate a suction force, having a magnitude corresponding to an amount of current supplied, between the core and the plunger, the suction force being a solenoidal force in a closing direction of the main valve, which is an opening direction of the sub-valve;
an actuating rod configured to be capable of directly or indirectly transmitting the solenoidal force to the main valve element and the sub-valve element, the actuating rod being coupled to the plunger;
a biasing member configured to bias the main valve element in the closing direction of the main valve so that the actuating rod and the main valve element are kept in a state in which the actuating rod and the main valve element are not displaced relative to each other in the direction of axis line while the main valve element is normally slidable along the guiding passage, the biasing member being made of an elastic material; and
a pressing mechanism including the actuating rod, the pressing mechanism being configured to increase a pressing load, by which to press the main valve element in the closing direction of the main valve, by increasing the solenoidal force while the main valve element is incapable of normally sliding along the guiding passage so that the actuating rod is displaced relative to the main valve element in the closing direction of the main valve,
wherein the pressing mechanism has a to-be-engaged portion provided integrally with the main valve element, and an engagement portion provided integrally with the actuating rod, the engagement portion being positioned opposite to the to-be-engaged portion in the direction of axis line,
wherein the biasing member biases the main valve element so that the engagement portion and the to-be-engaged portion are kept spaced apart from each other at a predetermined interval while the main valve element is sliding, wherein as the solenoidal force is increased while the main valve element is stopped, the actuating rod is driven in the opening direction of the sub-valve, which is the closing direction of the main valve, so that the engagement portion comes into contact with the to-be-engaged portion and the actuating rod directly presses the main valve element in the closing direction of the main valve, and wherein the sub-valve element has a hole formed in the direction of axis line, through which an end of the actuating rod farther from the plunger is inserted.

18. A composite valve according to claim 17, wherein the actuating rod and the sub-valve element are so configured to be displaceable relative to each other, and wherein the actuating rod is engaged with the sub-valve element by displacing relative to the body, and the actuating rod has a pressing portion capable of directly transmitting the solenoidal force, biased in an opening direction of the sub-valve, to the sub-valve element.

19. A composite valve according to claim 17, wherein the biasing member is set between a part integrated with the actuating rod and the main valve element, and wherein the displacement of the actuating rod relative to the main valve element caused by the increase in the solenoidal force while the main valve element is incapable of normally sliding along the guiding passage compresses the biasing member to increase the pressing load of the biasing member applied to the main valve element in the closing direction of the main valve.

* * * * *